US012119592B2

(12) United States Patent
Li et al.

(10) Patent No.: US 12,119,592 B2
(45) Date of Patent: Oct. 15, 2024

(54) POWER DELIVERY DEVICE AND CONTROL METHOD THEREOF

(71) Applicant: GETAC TECHNOLOGY CORPORATION, New Taipei (TW)

(72) Inventors: Chui-Hsien Li, Taipei (TW); Chin-Jung Chang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 155 days.

(21) Appl. No.: 17/980,498

(22) Filed: Nov. 3, 2022

(65) Prior Publication Data

US 2023/0236658 A1 Jul. 27, 2023

Related U.S. Application Data

(60) Provisional application No. 63/302,983, filed on Jan. 25, 2022.

(51) Int. Cl.
*G06F 1/32* (2019.01)
*G06F 1/26* (2006.01)
(Continued)

(52) U.S. Cl.
CPC ......... *H01R 13/7036* (2013.01); *G06F 1/263* (2013.01); *G06F 1/324* (2013.01);
(Continued)

(58) Field of Classification Search
None
See application file for complete search history.

(56) References Cited

U.S. PATENT DOCUMENTS

| 8,878,859 B1 | 11/2014 | van Scherrenburg |
| 2007/0018956 A1 | 1/2007 | Kim et al. |

(Continued)

FOREIGN PATENT DOCUMENTS

| CN | 102801322 A | 11/2012 |
| CN | 103412632 A | 11/2013 |

(Continued)

OTHER PUBLICATIONS

European Patent Office, Search report, Applicaiton No. 22208798.3, Jun. 16, 2023, Germany.

*Primary Examiner* — Fahmida Rahman
(74) *Attorney, Agent, or Firm* — Cooper Legal Group, LLC

(57) ABSTRACT

A control method of a power delivery device includes communicating with a power adaptor through a configuration channel pin of a connector to acquire a power supply quota of the power adaptor and generate a power consumption threshold based on the acquired power supply quota, selecting a corresponding scenario mode from a plurality of scenario modes according to a scenario setting signal generated by a setting circuit when a total power consumption of a system circuit is greater than the power consumption threshold, selecting a corresponding exclusion parameter from a plurality of exclusion parameters according to the corresponding scenario mode, excluding a corresponding power-down procedure from a plurality of power-down procedures according to the corresponding exclusion parameter to generate a selected power-down group, and performing at least one power-down procedure in the selected power-down group to reduce the total power consumption.

10 Claims, 24 Drawing Sheets

(51) Int. Cl.
    *G06F 1/324*     (2019.01)
    *G06F 1/3296*     (2019.01)
    *G06F 3/14*     (2006.01)
    *G09G 5/00*     (2006.01)
    *H01R 13/703*     (2006.01)
    *H01R 31/06*     (2006.01)

(52) U.S. Cl.
    CPC .......... *G06F 1/3296* (2013.01); *G06F 3/1423* (2013.01); *G09G 5/006* (2013.01); *H01R 31/065* (2013.01); *G09G 2330/022* (2013.01); *G09G 2370/22* (2013.01)

(56) References Cited

U.S. PATENT DOCUMENTS

| | | |
|---|---|---|
| 2010/0097357 A1 | 4/2010 | Lin |
| 2010/0115314 A1* | 5/2010 | Sultenfuss ............ G06F 1/3203 713/323 |
| 2013/0110424 A1* | 5/2013 | Nagathil ............... H04B 17/327 702/62 |
| 2014/0253564 A1 | 9/2014 | Redman et al. |
| 2014/0310537 A1 | 10/2014 | Messick et al. |
| 2016/0048189 A1* | 2/2016 | Bhardwaj ............. G06F 1/3206 713/320 |
| 2016/0116969 A1 | 4/2016 | Biswas et al. |
| 2017/0222457 A1 | 8/2017 | Hijazi et al. |
| 2018/0175636 A1 | 6/2018 | Choi |
| 2020/0083740 A1 | 3/2020 | Sultenfuss et al. |
| 2020/0136593 A1 | 4/2020 | Chen et al. |
| 2021/0232202 A1 | 7/2021 | Sultenfuss et al. |

FOREIGN PATENT DOCUMENTS

| | | |
|---|---|---|
| CN | 113741674 A | 12/2021 |
| TW | 201443772 A | 11/2014 |
| TW | 201835770 A | 10/2018 |
| TW | M593581 U | 4/2020 |
| TW | 202017287 A | 5/2020 |

* cited by examiner

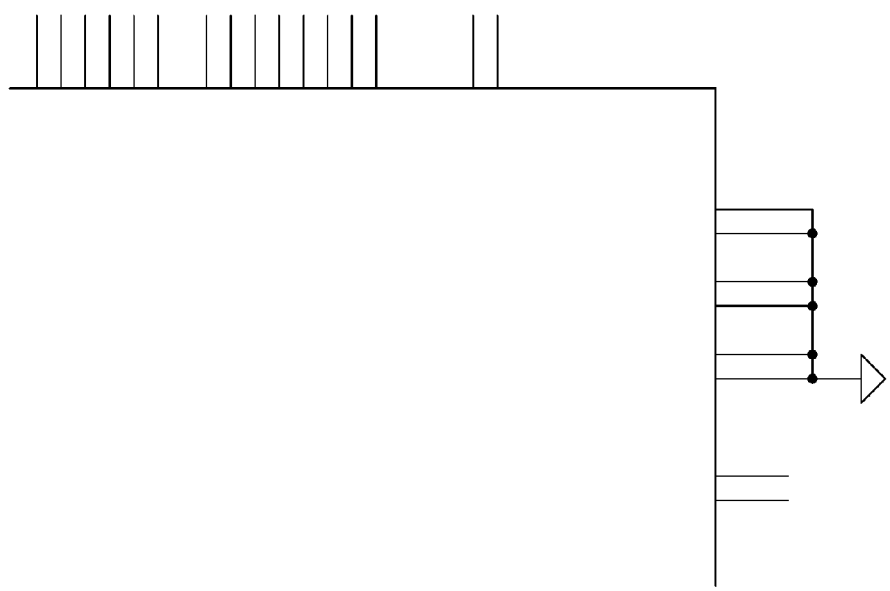

POWER DELIVERY DEVICE AND CONTROL METHOD THEREOF

The application claims priority to U.S. Provisional Application No. 63/302,983, filed on Jan. 25, 2022, the disclosure of which is hereby incorporated by reference herein in its entirety.

BACKGROUND OF THE INVENTION

Field of the Invention

The present invention relates to a power control technique, and more particularly, to a power delivery device and a control method thereof.

Description of the Prior Art

In general, an electronic device is provided with an adaptor for powering and charging. However, if an external adaptor connected to an electronic device does not comply with the specifications demanded by the electronic device, the power supplied by the adaptor may not satisfy the minimum power consumption for operating the electronic device, such that the adaptor may be overloaded and power may be disconnected, and thus the electronic device may not be able to continue operating normally.

SUMMARY OF THE INVENTION

In one embodiment, a power delivery device includes a system circuit, a setting circuit, a connector, a power management circuit and a control circuit. The setting circuit generates a different scenario setting signal in response to a different input. The connector is adapted to be externally connected to a power adaptor. The connector includes a power supply pin and a configuration channel (CC) pin. The power management circuit is connected to the connector and the system circuit. The power management circuit is, when the connector is externally connected to the power adaptor, for drawing a supply power through the power supply pin, providing a system power to the system circuit according to the supply power, and detecting a total power consumption of the system circuit. The control circuit is connected to the system circuit, the setting circuit, the connector and the power management circuit. The control circuit has a plurality of scenario modes, a plurality of exclusion parameters and a plurality of power-down procedures stored therein, wherein the plurality of scenario modes correspond to the different scenario setting signal and the plurality of exclusion parameters, and the plurality of exclusion parameters correspond to the plurality of power-down procedures. Each of the power-down procedures is for changing a different operation parameter of one between the system circuit and the control circuit. The control circuit is for communicating with the power adaptor through the configuration channel pin of the connector to acquire a power supply quota of the power adaptor, selecting a corresponding scenario mode from the plurality of scenario modes according to a scenario setting signal generated by the setting circuit when the total power consumption of the system circuit is greater than the power consumption threshold, selecting a corresponding exclusion parameter from the plurality of exclusion parameters according to the corresponding scenario mode, excluding a corresponding power-down procedure from the plurality of power-down procedures according to the corresponding exclusion parameter to generate a selected power-down group, and performing at least one power-down procedure in the selected power-down group to reduce the total power consumption. The power consumption threshold is generated based on the acquired power supply quota.

In one embodiment, a control method of a power delivery device includes: communicating with a power adaptor through a configuration channel pin of a connector to acquire a power supply quota of the power adaptor, and generating a power consumption threshold based on the acquired power supply quota; drawing a supply power through a power supply pin of the connector when the connector is externally connected to the power adaptor, and providing a system power to a system circuit according to the supply power; detecting a total power consumption of the system circuit; selecting a corresponding scenario mode from a plurality of scenario modes according to a scenario setting signal generated by a setting circuit when the total power consumption of the system circuit is greater than the power consumption threshold; selecting a corresponding exclusion parameter from a plurality of exclusion parameters according to the corresponding scenario mode; excluding a corresponding power-down procedure from a plurality of power-down procedures according to the corresponding exclusion parameter to generate a selected power-down group; and performing at least one power-down procedure in the selected power-down group to reduce the total power consumption. The plurality of scenario modes respectively correspond to the plurality of exclusion parameters, and respectively correspond to a plurality of different scenario setting signals. Herein, the scenario setting signal generated by the setting circuit is one of the plurality of scenario setting signals. The plurality of exclusion parameters respectively correspond to the plurality of power-down procedures, and each of the power-down procedures is for changing an operation parameter of one between the system circuit and the control circuit.

In conclusion, according to any of the embodiments, the power delivery device, by implementing the control method thereof, is capable of determining whether the power supply quota of the power adaptor satisfies the total power consumption of the system circuit, and reduces the total power consumption when the power supply quota does not satisfy the total power consumption. Thus, the power delivery device is capable of continually drawing electric power from the power adaptor and operating normally when it is externally connected to a power adaptor that does not meet its required specifications. In some embodiments, the power delivery device, by implementing the control method thereof, is capable of excluding a power-down procedure inappropriate for a current scenario, such that the power delivery device is allowed to draw electric power rapidly from the power adaptor that does not meet its required specifications.

BRIEF DESCRIPTION OF THE DRAWINGS

FIGS. 4A to 4D are schematic diagrams of a partial circuit of a microcontroller of a control circuit in an example.

DETAILED DESCRIPTION OF THE EMBODIMENTS

Figure 1:
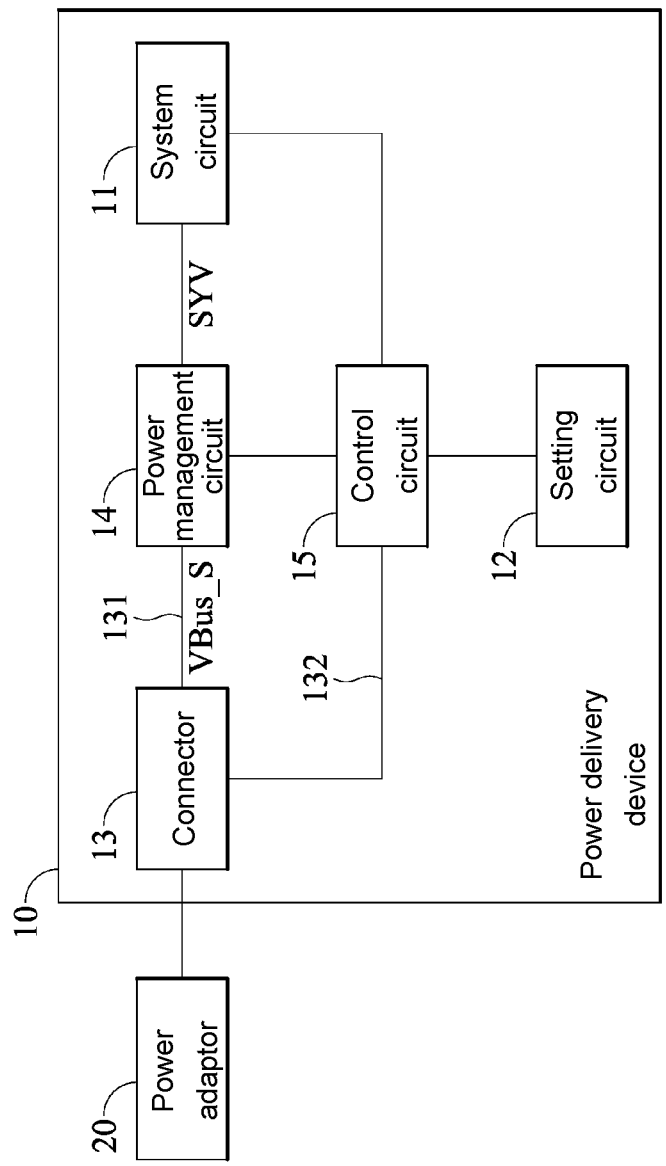
FIG. 1 is a schematic diagram of a power delivery device according to some embodiments.

Referring to FIG. 1, a power delivery device 10 includes a system circuit 11, a setting circuit 12, a connector 13, a power management circuit 14 and a control circuit 15. The power management circuit 14 is connected to the connector 13 and the system circuit 11. The control circuit 15 is connected to the system circuit 11, the setting circuit 12, the connector 13 and the power management circuit 14. In some embodiments, the power delivery device 10 may be chargeable electronic device such as a laptop computer, a desktop computer or a mobile digital device.

The system circuit 11 is for processing operations of various system functions of the power delivery device 10. For example, the system circuit 11 is for processing operations of an energy storage function, a display function, a communication function and an audio function of the power delivery device 10.

The setting circuit 12 is for generating a different scenario setting signal in response to a different input. In some embodiments, the setting circuit 12 is a user interface. In an example, the user interface may be a keyboard having a plurality of keys. Different key combinations are different inputs, and each of the key combinations is formed by multiple keys. When different key combinations are pressed by a user, the setting circuit 12 generates different scenario setting signals. For example, assume that a first key combination is formed by the key "Alt" and the key "A", and a second key combination is formed by the key "Alt" and the key "B". When the first key combination ("Alt"+"A") is pressed, the setting circuit 12 generates a first scenario setting signal; when the second key combination ("Alt"+"B") is pressed, the setting circuit 12 generates a second scenario setting signal different from the first scenario setting signal. In an example, the user interface may be a touch display panel that displays a plurality of option icons. The option icons are individually different inputs. When different option icons are selected by the user, the setting circuit 12 generates different scenario setting signals.

Figure 2:
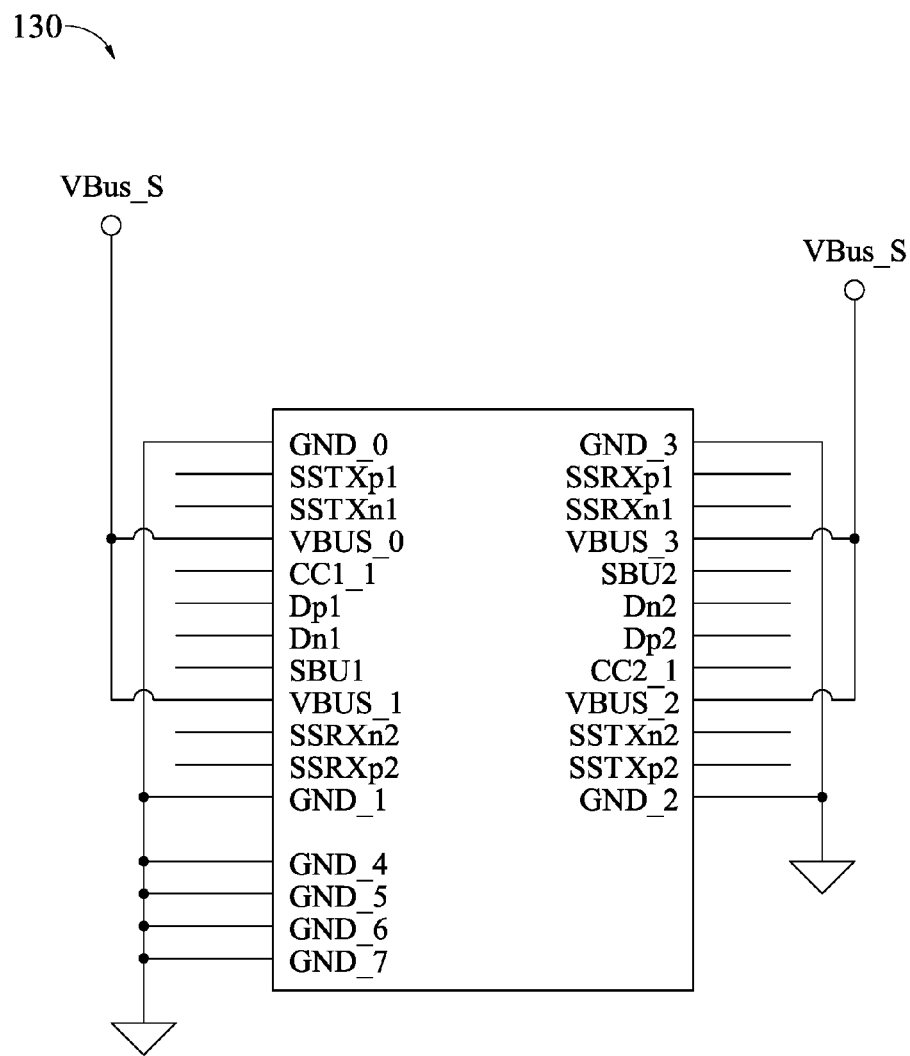
FIG. 2 is a schematic diagram of an adaptor of a connector in an example.

The connector 13 is adapted to be externally connected to a power adaptor 20. In some embodiments, the power adaptor 20 may be an alternating-current-to-direct-current (AC/DC) power adaptor. In some embodiments, as shown in FIG. 2, the connector 13 has an adaptor 130, and the power adaptor 20 has a connection port (not shown). When the adaptor 130 and the connection port are connected to each other, the connector 13 draws a supply power VBus_S (for example, a DC supply power) from the power adaptor 20. In other words, the adaptor 130 matches the connection port, for example, the connection port is a USB plug and the adaptor 130 is a USB receptacle, and the USB plug and the USB receptacle are of the same USB version.

Herein, the connector 13 includes a power supply pin 131 and a configuration channel (CC) pin 132. The power supply pin 131 is for receiving the supply power VBus_S from the power adaptor 20. In some embodiments, the power supply pin 131 and the configuration channel pin 132 may be implemented by the adaptor 130. For example, as shown in FIG. 2, the power supply pin 131 may be implemented by at least one of a first terminal VBUS_0, a second terminal VBUS_1, a third terminal VBUS_2 and a fourth terminal VBUS_3 of the adaptor 130. Thus, when the adaptor 130 and the connection port are connected to each other, the connector 13 can then draw the supply power VBus_S from the power adaptor 20 through the power supply pin 131. The configuration channel pin 132 may be implemented by one between a fifth terminal CC_1 and a sixth terminal CC_2 of the adaptor 130.

In some embodiments, in addition to the power supply pin 131 and the configuration channel pin 132, the adaptor 130 may implement other types of pins of the connector 13 according to the definition of its USB version (that is, the USB version of the connector 13). For example, as shown in FIG. 2, when the connector 13 is a USB Type-C connector, a seventh terminal SSTXp1 and an eighth terminal SSTXn1 (or a ninth terminal SSTXp2 and a tenth terminal SSTXn2) of the connector 130 may be implemented as high-speed transmission pins of the connector 13. An eleventh terminal SSRXp1 and a twelfth terminal SSRXn1 (or a thirteenth terminal SSRXp2 and a fourteenth terminal SSRXn2) of the connector 130 may be implemented as high-speed reception pins of the connector 13. A fifteenth terminal Dp1 and a sixteenth terminal Dn1 (or a seventeenth terminal Dp2 and an eighteenth terminal Dn2) of the connector 130 may be implemented as a positive data pin and a negative data pin of the connector 13. A nineteenth terminal SBU1 (or a twentieth pin SBU2) of the adaptor 130 may be implemented as an auxiliary pin of the connector 130 to transmit auxiliary signals. One between the fifth terminal CC_1 and the sixth terminal CC_2 of the adaptor 130 may be implemented as the configuration channel pin 132 and the other may be implemented as a cable power supply pin (Vconn) of the connector 13. At least one of a twenty-first terminal GND_0, a twenty-second terminal GND_1, a twenty-third terminal GND_2, a twenty-fourth terminal GDN_3, a twenty-fifth terminal GND_4, a twenty-sixth terminal GND_5, a twenty-seventh terminal GND_6 and a twenty-eighth terminal GND_7 of the adaptor 130 may be implemented as a ground pin of the connector 130 to connect to a reference ground.

Herein, the positive data pin, the negative data pin, the high-speed reception pins and the high-speed transmission pins may be connected to the control circuit 15 and the system circuit 11, for the control circuit 15 and the system circuit 11 to acquire and process data signals of a host device connected to the power adaptor 20. The host device is, for example but not limited to, a USB communication control device (communications and CDC control, e.g., a network card, a modem or a serial port), a human-machine interface device (e.g., a keyboard or a mouse), a physical interface device (e.g., a control rod), a still image capturing device (e.g., an image scanner), a printing device (e.g., a printer), a mass storage device (e.g., a portable disk, a mobile hard drive, a memory card, or a digital camera), a USB hub, a communication device (a CDC-date, e.g., a modem and a fax machine), a smart card device (e.g., a card reader), a video device (e.g., a network camera), an audio/video interface (e.g., a television), or a wireless transmission device (wireless controller, e.g., Bluetooth).

Again referring to FIG. 1, when the connector 13 is externally connected to the power adaptor 20, the power management circuit 14 can draw the supply power VBus_S through the power supply pin 131, and provide a system power SYV to the system circuit 11 according to the supply power VBus_S. For example, the power management circuit 14 generates the system power SYV by performing voltage stabilization, stepping-up or stepping-down processing on the supply power VBus_S. Herein, the power management circuit 14 may further detect a total power consumption when the system circuit 11 is powered by the system power SYV. In some embodiments, the power management circuit 14 may further provide the system power SYV (or another power supply having a voltage level different from that of the system power SYV) to the control circuit 15 and the setting circuit 12. In some other embodiments, the control circuit 15 and the setting circuit 12 may also be powered by built-in power sources. In some embodiments, the power circuit 14 may be implemented by a gauge integrated circuit and a voltage regulation circuit.

Figure 3:
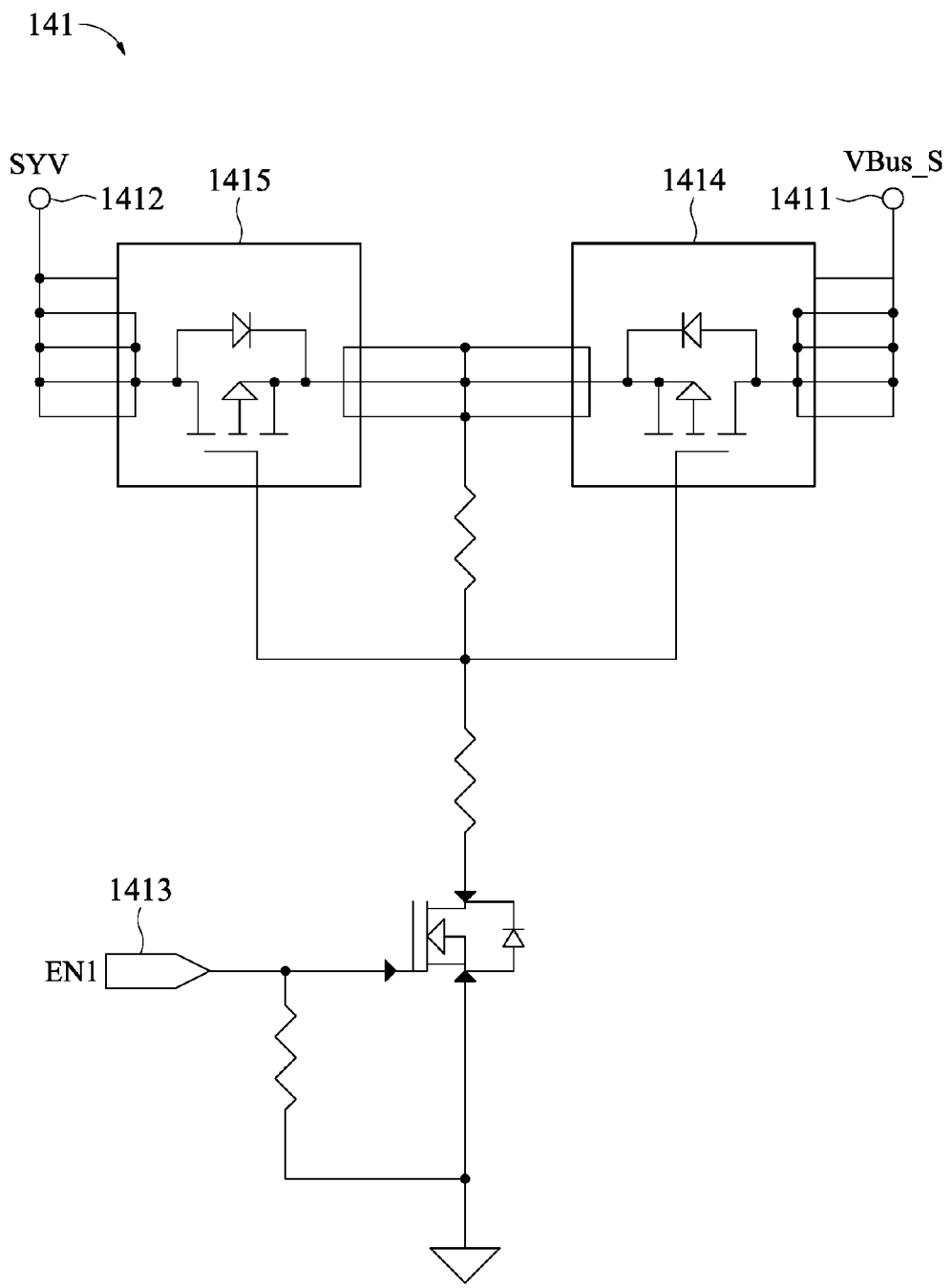
FIG. 3 is a schematic diagram of a bidirectional switch circuit in a power management circuit in an example.
Figure 4A:
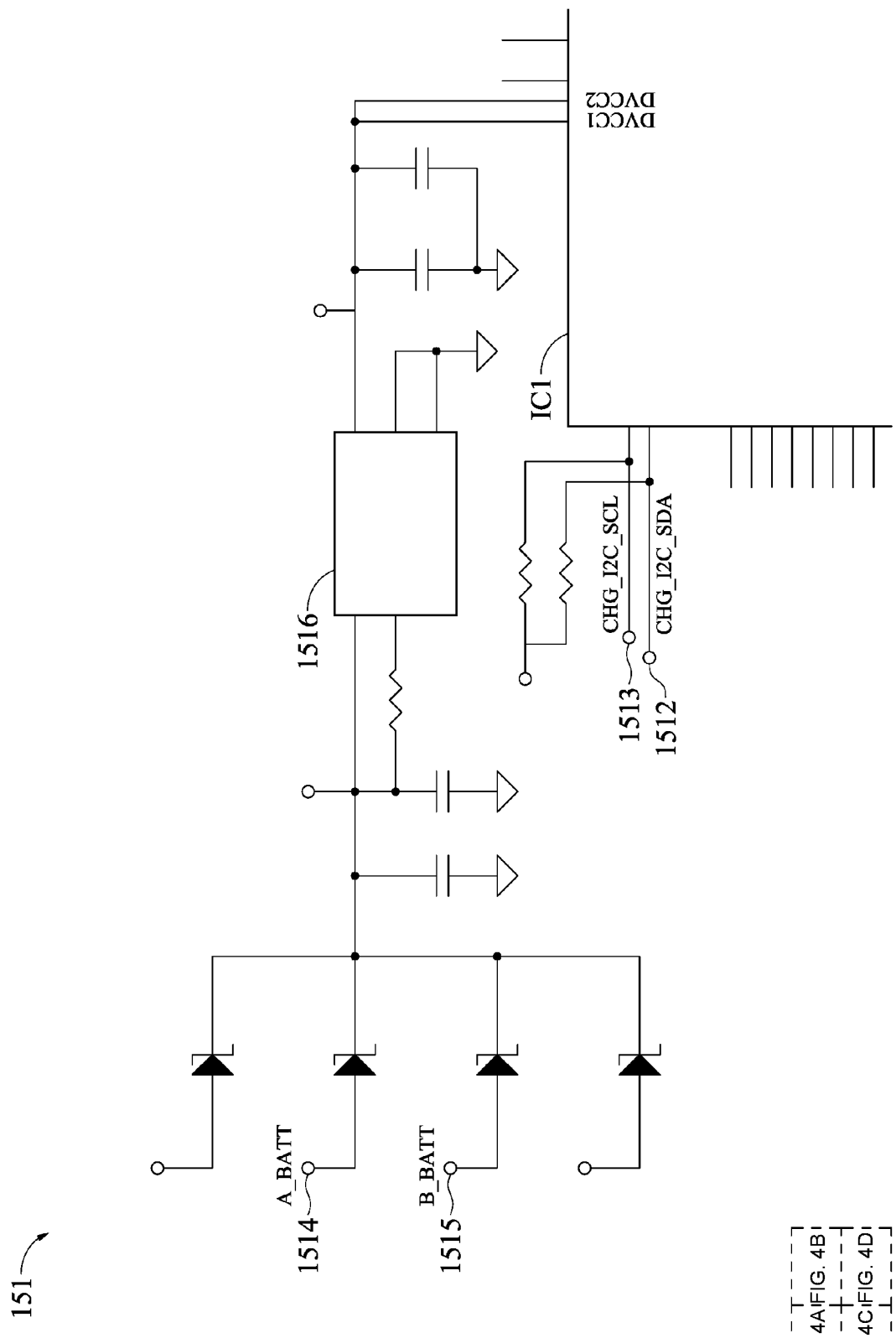
Figure 4B:
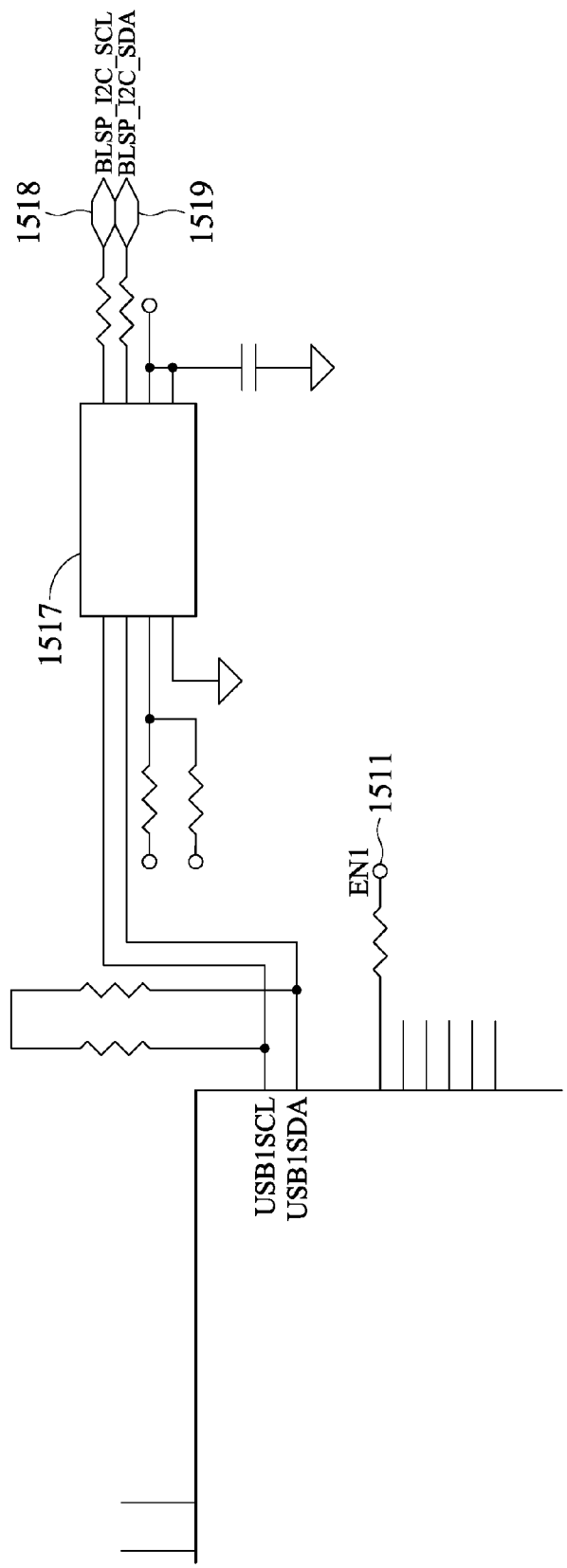
Figure 4C:
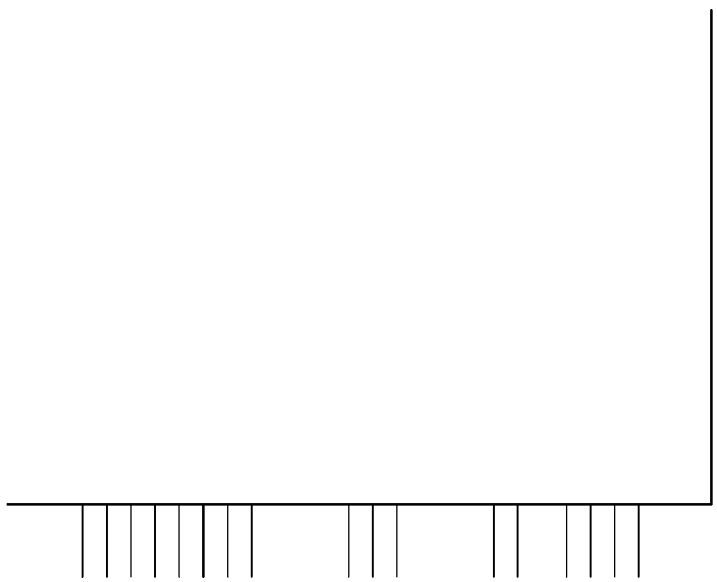

In some embodiments, as shown in FIGS. 3 to 4D, the power management circuit 14 includes a bidirectional switch 141. A contact 1411 of a first switch 1414 of the bidirectional switch 141 is connected to the power supply pin 131 of the connector 13, and receives the supply power VBus_S from the power supply pin 131. A contact 1412 of a second switch 1415 of the bidirectional switch 141 is connected to the system circuit 11. The first switch 1414 and the second switch 1415 may be implemented by transistors. The control circuit 15 includes a microcontroller 151. The microcontroller 151 may be implemented by a control integrated circuit IC1 and its matching circuits. The microcontroller 151 may perform main operational functions of the control circuit 15. A contact 1511 of the microcontroller 151 is connected to a contact 1413 of the bidirectional switch 141. The microcontroller 151 generates an enable signal EN1 at the contact 1511, and inputs the enable signal EN1 to the bidirectional switch 141 through the contact 1413. The bidirectional switch 141 turns off the first switch 1414 and the second switch 1415 according to the enable signal EN1. For example, when the enable signal EN1 is at a low level, the bidirectional switch 141 turns off the first switch 1414 and the second switch 1415. Thus, a current flow between the contact 1411 and the contact 1412 may be disconnected, thereby preventing mutual interference between the contact 1411 and the contact 1412.

Herein, the control circuit 15 has a plurality of scenario modes, a plurality of exclusion parameters and a plurality of power-down procedures stored therein. The plurality of scenario modes respectively correspond to the plurality of exclusion parameters, and the plurality of exclusion parameters respectively correspond to the plurality of power-down procedures. The plurality of scenario modes further respectively correspond to a plurality of different scenario setting signals. Each of the power-down procedures is for changing a different operation parameter of one between the system circuit 11 and the control circuit 15, thereby reducing total power consumption. In some embodiments, the correspondence among the plurality of scenario modes, the plurality of exclusion parameters, the plurality of power-down procedures and the plurality of scenario setting signals may be stored in the form of a mapping table in the control circuit 15. In other words, the mapping table records the scenario modes respectively corresponding to the scenario setting signals and the exclusion parameters respectively corresponding to the scenario modes, and this mapping table is stored in a built-in memory of the control circuit 15. Each of the exclusion parameters indicates the power-down procedures to be excluded, that is, corresponding to which power-down procedure(s) (to be referred to as a power-down combination below). In some embodiments, the control circuit 15 may be implemented by an operation device such as a microcontroller and a system-on-chip.

Figure 5:
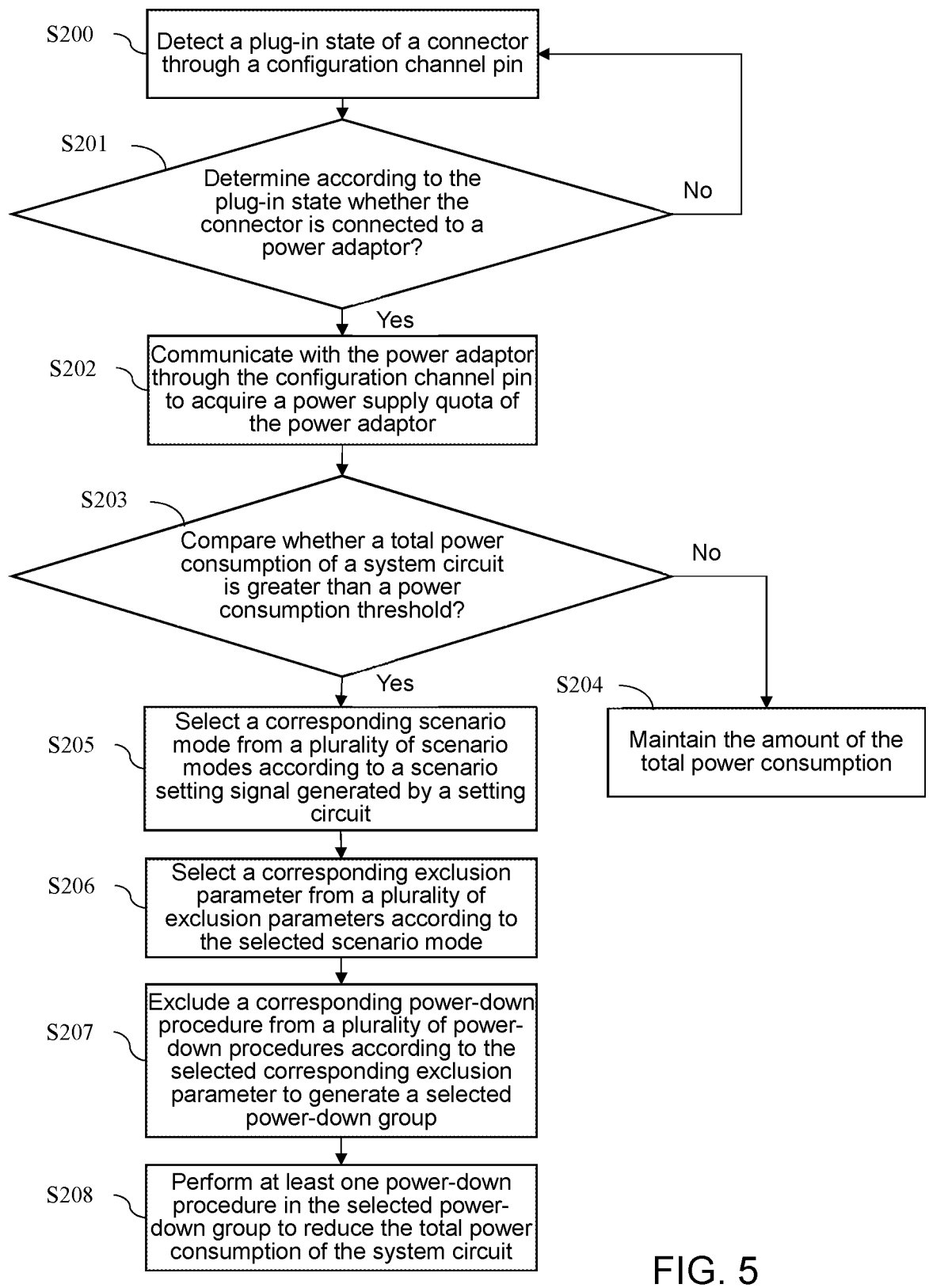
FIG. 5 is a flowchart of a control method of a power delivery device according to some embodiments.

Referring to FIG. 1 and FIG. 5, the control circuit 15 detects a plug-in state of the connector 13 through the configuration channel pin 132 (step S200), so as to determine whether the connector 13 is connected to the power adaptor 20 (step S201). For example, the control circuit 15 acquires a voltage level of the configuration channel pin 132, and determines according to whether the voltage level of the configuration channel pin 132 is greater than a connection threshold whether the connector 13 is connected to the power adaptor 20. Specifically, the power adaptor 20 has a pull-up resistor and a configuration channel terminal, wherein the configuration channel terminal is connected to the pull-up resistor. The connector 13 has a pull-down resistor connected to the configuration channel pin 132. When the connector 13 is not yet externally connected to the power adaptor 20, the configuration channel pin 132 is pulled down by the pull-down resistor to a low voltage level that is not greater than the connection threshold. When the connector 13 is externally connected to the power adaptor 20, the configuration channel pin 132 is connected to the configuration channel terminal, such that the configuration channel pin 132 is pulled up by the pull-up resistor connected thereto to a high voltage level that is greater than the connection threshold. As such, when the voltage level that the control circuit 15 acquires from the configuration channel pin 132 is greater than the connection threshold, the control circuit 15 can accordingly determine that the connector 13 is connected to the power adaptor 20. Conversely, when the voltage level that the control circuit 15 acquires from the configuration channel pin 132 is not greater than the connection threshold, the control circuit 15 can accordingly determine that the connector 13 is not yet connected to the power adaptor 20.

When the control circuit 15 detects that the connector 13 is externally connected to the power adaptor 20, the control circuit 15 communicates with the power adaptor 20 through the configuration channel pin 132, so as to acquire a power supply quota of the power adaptor 20 (step S202). For example, once the connector 13 is externally connected to the power adaptor 20, the power adaptor 20 sends a power supply ability signal to the configuration channel pin 132 through the configuration channel terminal. The power supply ability signal includes power supply options of the power adaptor 20. The power supply options contain a plurality of rated voltage values and a rated current value corresponding to each of the rated voltages. A combination formed by each of the rated voltage values and the corresponding rated current value is the power supply quota and satisfies USB charging standard specifications, and is for example, 5 V and 3 A, 9 V and 3 A, 15 V and 3 A, 15 V and 2 A, 20 V and 3.5 A, 28 V and 5 A, 36 V and 5 A, and 48 V and 5 A. More specifically, the power supply quota is obtained by multiplying each rated voltage value by the corresponding rated current value. The control circuit 15 acquires the power supply ability signal through the configuration channel pin 132, and analyzes the power supply ability signal to acquire the plurality of power supply quotas in the power supply options. The control circuit 15 selects the largest one from the plurality of power supply quotas as a power supply quota that the power adaptor 20 supplies to the power delivery device 10. Once the control circuit 15 has selected the power supply quota, a power supply request signal is generated according to the rated voltage values and the rated current values corresponding to the power supply quota, and the power supply request signal is sent to the configuration channel terminal through the configuration channel pin 132. The first power adaptor 20 acquires the power supply request signal though the configuration channel terminal, and provides the power delivery device 10 with the supply power VBus_S according to the rated voltage values and the rated current values corresponding to the power supply quota in response to the power supply request signal.

Figure 6:
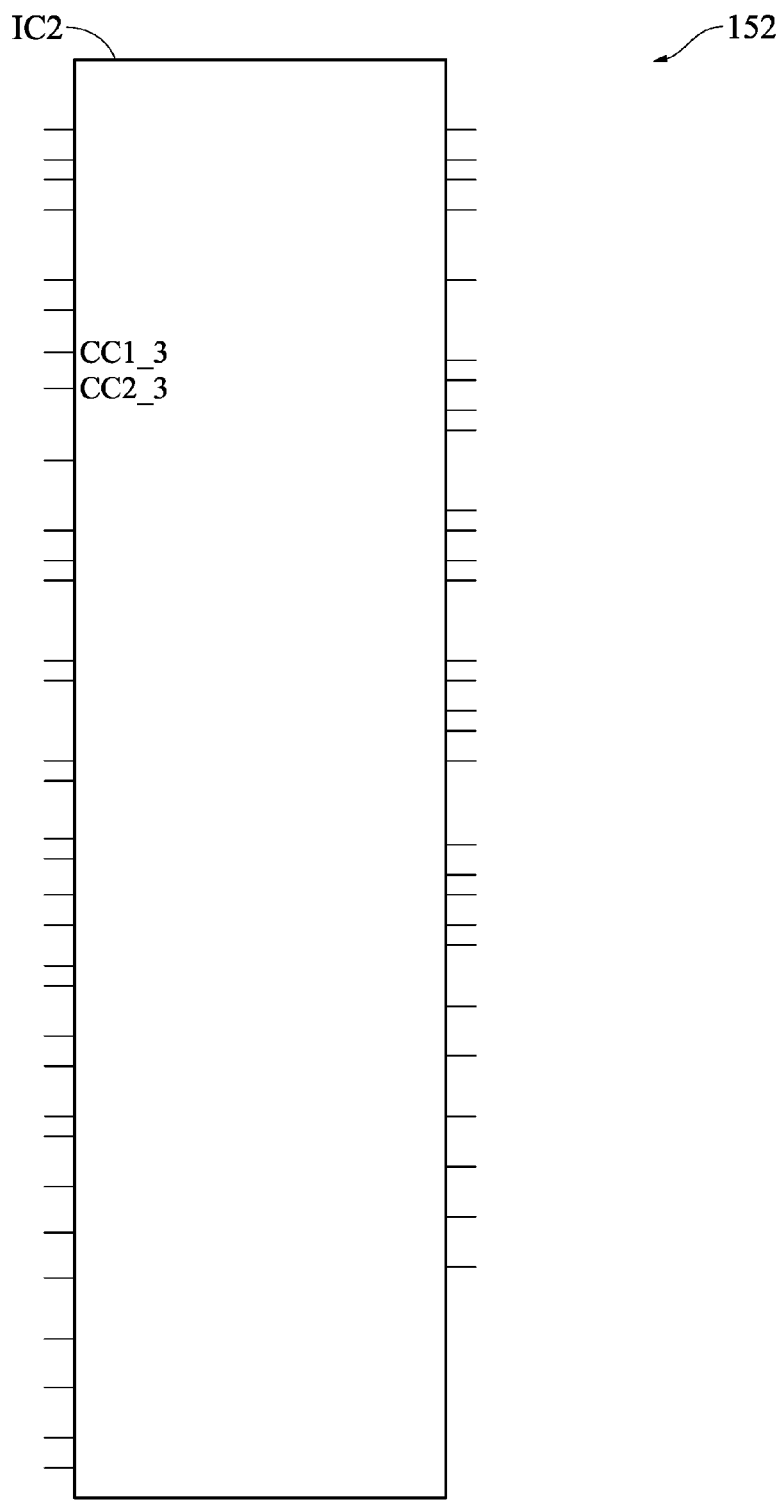
FIG. 6 is a schematic diagram of a partial circuit of a power communication circuit of a control circuit in an example.
Figure 7:
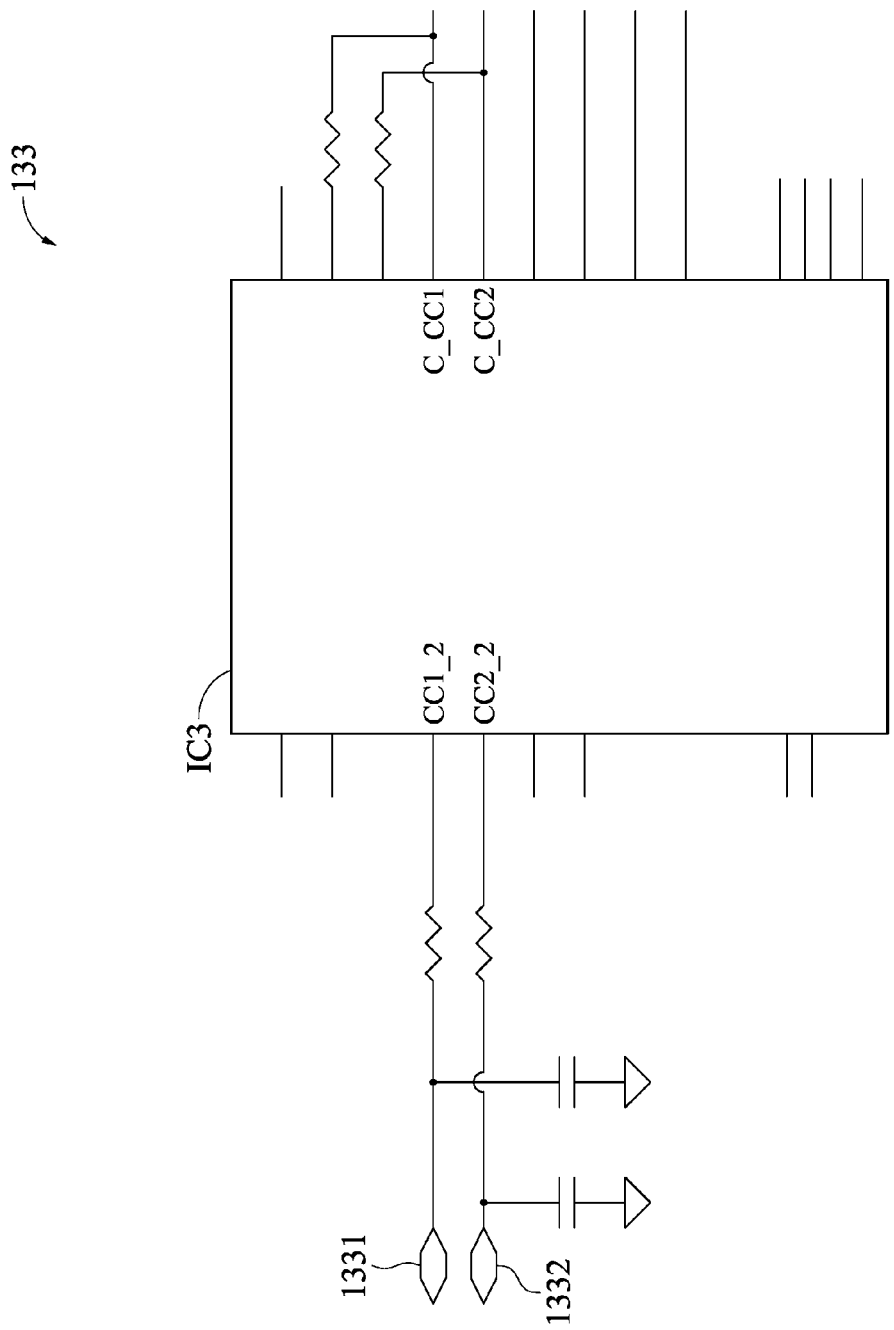
FIG. 7 is a schematic diagram of a partial circuit of a configuration channel communication circuit of a connector in an example.

In some embodiments, as shown in FIG. 2, FIG. 6 and FIG. 7, the control circuit 15 includes a power communication circuit 152, and the connector 13 includes a configuration channel communication circuit 133. The power communication circuit 152 may be implemented by a power integrated circuit 102 and its matching circuits. The configuration channel communication circuit 133 may be implemented by a control integrated circuit IC3 and its matching circuits. A connection terminal C_CC1 and a connection terminal C_CC2 of the configuration channel communication circuit 133 are respectively connected to the fifth terminal CC1_1 and the sixth terminal CC2_1 of the adaptor 130. A contact 1311 of the connection terminal C_CC1 and a contact 1332 of the connection terminal C_CC2 of the configuration channel communication circuit 133 are respectively connected to the connection terminal CC1_3 and the connection terminal CC2_3 of the power communication circuit 152. Thus, the control circuit 15 is capable of communicating with the configuration channel pin 132 and the power adaptor 20 through the power communication circuit 152 and the configuration channel communication circuit 133 (for example, transmissions of the power supply ability signal and the power supply request signal), so as to select the power supply quota for the power adaptor 20 to provide the supply power VBus_S. In some embodiments, a first filter circuit (for example, a resistor and a capacitor connected in series) is provided between the contact 1331 and the connection terminal C_CC1, so as to filter signals transmitted by the connection terminal C_CC1 to thereby reduce noise interference. Similarly, a second filter circuit (for example, a resistor and a capacitor connected in series) is provided between the contact 1332 and the connection terminal C_CC2, so as to reduce the possibility of noise interference of signals transmitted by the connection terminal C_CC2. In some embodiments, the first filter circuit and the second filter circuit may be the same or different.

Again referring to FIG. 1 and FIG. 5, the control circuit 15 generates a power consumption threshold based on the acquired power supply quota, and compares whether the total power consumption of the system circuit 11 is greater than the power consumption threshold (step S203). When the total power consumption is not greater than the power consumption threshold, it means that the power delivery device 10 is capable of continually drawing electric power from the power adaptor 20 and operating normally. At this point, the control circuit 15 maintains the amount of the total power consumption (step S204). When the total power consumption is greater than the power consumption threshold, it means that the power supply quota of the adaptor 20 may not be able to satisfy the total power consumption needed by the system circuit 11. At this point, the control circuit 15 performs an adjustment procedure of an execution number of a power-down procedure (steps S205 to S208), so as to reduce the amount of the total power consumption to be not greater than the power consumption threshold, thereby allowing the power delivery device 10 to continually draw electric power from the power adaptor 20 and operate normally. The control circuit 15 generates the power consumption threshold by using a selected power supply quota of the power adaptor 20.

In some embodiments, in step S203, the selected power supply quota of the power adaptor 20 may be used as the power consumption threshold. In other words, once a power supply quota is selected, the control circuit 15 directly compares whether the total power consumption of the system circuit 11 is greater than the selected power supply quota, and further determines according to the comparison result whether to reduce the amount of the total power consumption.

In some other embodiments, in step S203, the power consumption threshold may be a product of the power supply quota of the power adaptor 20 and a proportionality constant (step S203). In other words, once a power supply quota is selected, the control circuit 15 compares whether the total power consumption is greater than the power supply quota obtained by multiplying the selected power supply quota by the proportionality constant (step S203), and further determines according to the comparison result whether to reduce the amount of the total power consumption. Thus, it is ensured that the control circuit 15 is still capable of accurately determining whether the power supply quota can satisfy the total power consumption needed by the system circuit 11 when the power adaptor 20 is affected by noise (for example, surges). The proportionality constant is less than 1, for example, the proportionality constant may be 0.8.

In the adjustment procedure, the control circuit 15 selects a corresponding scenario mode from the plurality of scenario modes according to a scenario setting signal generated by the setting circuit 12 (step S205). For example, when the first key combination or the first option icon is pressed, the setting circuit 12 generates a first scenario setting signal in response to the first key combination or the first option icon. When the setting circuit 12 currently generates the first scenario setting signal, the control circuit 15 looks up a mapping table (as shown in Table-1) according to the first scenario setting signal, so as to obtain the scenario mode (that is, the first scenario mode) corresponding to the first scenario setting signal from the mapping table. Similarly, when second first key combination or the second option icon is pressed, the setting circuit 12 generates a second scenario setting signal in response to the selected second key combination or second option icon. The control circuit 15 looks up the mapping table (as shown in Table-1) according to the second scenario setting signal, so as to obtain the scenario mode (that is, the second scenario mode) corresponding to the second scenario setting signal from the mapping table. Similarly, for example, the setting circuit 12 can generate a corresponding third scenario setting signal (or fourth scenario setting signal) in response to a pressed third key combination or third option icon (or fourth key combination or fourth option icon), and identify a corresponding third scenario mode (or fourth scenario mode) from the mapping table.

TABLE 1

| First scenario mode (corresponding to a first scenario setting signal) | First exclusion parameter (corresponding to a first power-down procedure combination) |
|---|---|
| Second scenario mode (corresponding to a second scenario setting signal) | Second exclusion parameter (corresponding to a second power-down procedure combination) |
| Third scenario mode (corresponding to a third scenario setting signal) | Third exclusion parameter (corresponding to a third power-down procedure combination) |
| Fourth scenario mode (corresponding to a fourth scenario setting signal) | Fourth exclusion parameter (corresponding to a fourth power-down procedure combination) |

Then, the control circuit 15 selects a corresponding exclusion parameter from the plurality of exclusion parameters according to the corresponding scenario mode selected in step S205 (step S206). For example, once the control circuit 15 selects the first scenario mode in step S205, the control circuit 15 acquires, according to the mapping table (as shown by Table-1), an exclusion parameter (that is, the first exclusion parameter) corresponding to the first scenario mode recorded in the mapping table. Similarly, when the second scenario mode is selected in step S205, the control circuit 15 acquires a second exclusion parameter corresponding to the second scenario mode from the mapping table. Similarly, the control circuit 15 can acquire a corresponding third exclusion parameter (or fourth exclusion parameter) from the mapping table when the third scenario mode (or fourth scenario mode) is selected.

Next, the control circuit 15 excludes a corresponding power-down procedure from the plurality of power-down procedures according to the corresponding exclusion parameter selected in step S206 to generate a selected power-down group (step S207). For example, if the control circuit 15 acquires the first exclusion parameter, a first power-down procedure combination (that is, one or more power-down procedures represented by the first exclusion parameter) is excluded from the plurality of power-down procedures, and the remaining (that is, the non-excluded) power-down procedures are combined into a selected power-down group. Similarly, if the control circuit 15 acquires the second exclusion parameter, a second power-down procedure combination is excluded from the plurality of power-down procedures. Similarly, if the control circuit 15 acquires the third exclusion parameter (or fourth exclusion parameter), a third power-down procedure combination (or fourth power-down combination) is excluded from the plurality of power-down procedures so as to generate a selected power-down group.

Then, the control circuit 15 switches from performing an original power-down procedure to performing at least one power-down procedure in the selected power-down group, so as to reduce the total power consumption of the system circuit 11 (step S208).

In some embodiments, different scenario modes may be respectively defined as different scenarios; for example, a scenario in which the power delivery device 10 needs to be quickly charged (to be referred to as a first scenario), a scenario in which the display brightness of the power delivery device 10 in an outdoor environment needs to be maintained (to be referred to as a second scenario), a scenario in which data processing efficiency of the power delivery device 10 needs to be maintained (to be referred to as a third scenario), and a scenario in which communication transmission efficiency of the power delivery device 10 needs to be maintained (to be referred to as a fourth scenario). Thus, with the selected power-down group, it is ensured that the operation parameter changed by the performed power-down procedure is appropriate for the scenario currently selected by the user. For example, if the user selects the first scenario by the setting circuit 12 (that is, the setting circuit 12 generates the first scenario setting signal), the charging efficiency of the power delivery device 10 can still be maintained after the control circuit 15 performs at least one power-down procedure in the corresponding selected power-down group. Similarly, if the user selects the second scenario by the setting circuit 12 (that is, the setting circuit 12 generates the second scenario setting signal), the display brightness of the power delivery device 10 can still be maintained after step S208 is performed. Similarly, if the user selects the third scenario (or fourth scenario) by the setting circuit 12, the data processing efficiency of the power delivery device 10 can still be maintained (or the communication transmission efficiency of the power delivery device 10 can still be maintained) after step S208 is performed.

Figure 8:
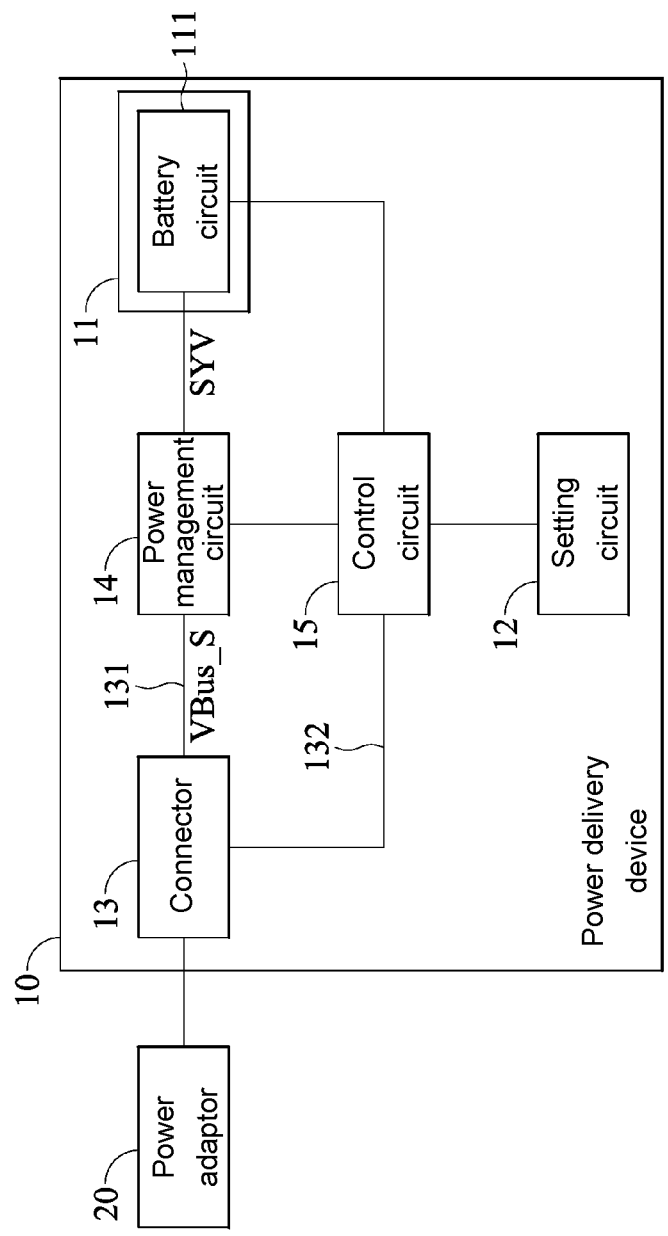
FIG. 8 is a schematic diagram of a power delivery device according to some embodiments.
Figure 9A:
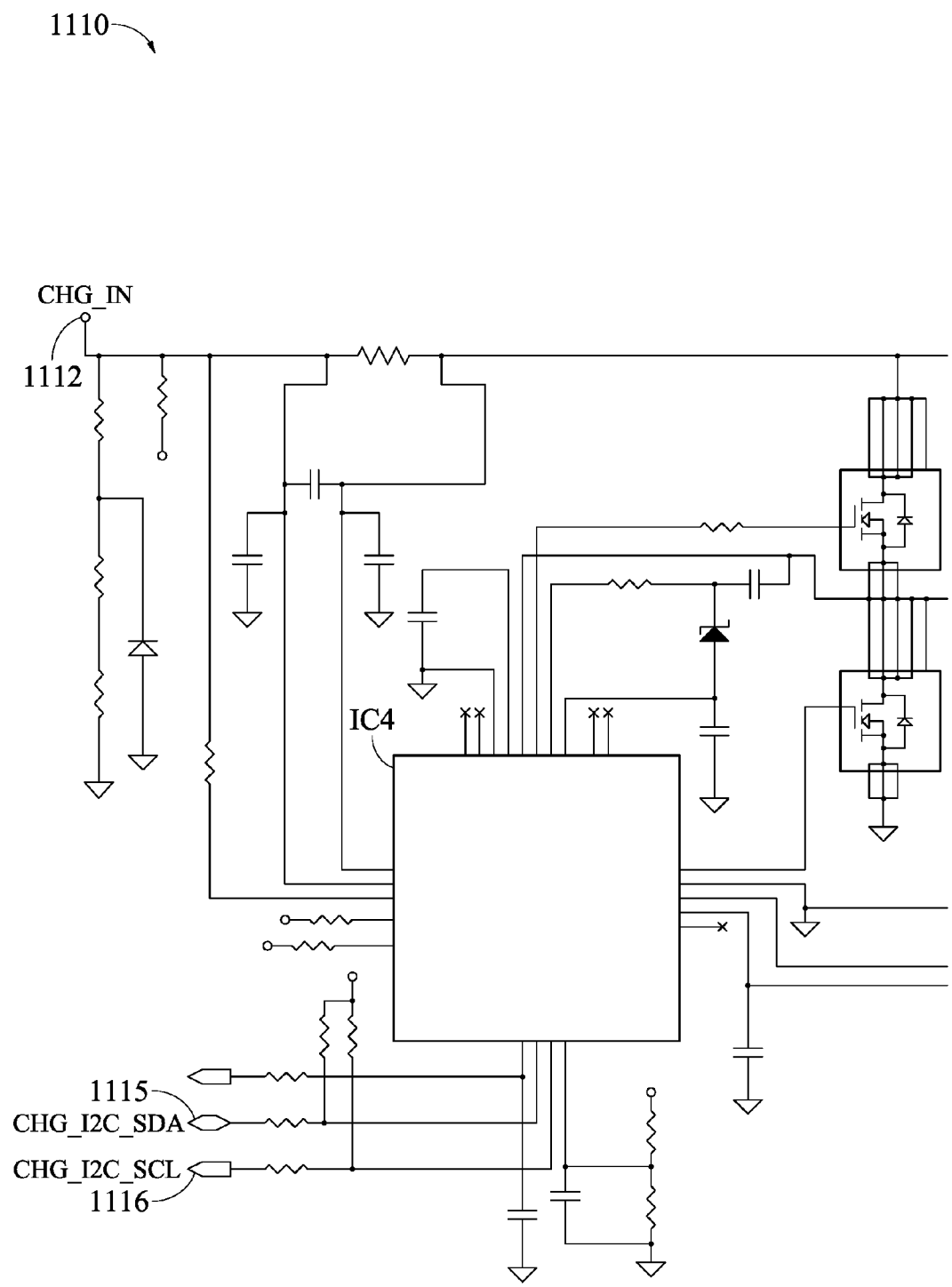
FIGS. 9A and 9B are schematic diagrams of a partial circuit of a charging/discharging circuit in a battery circuit in an example.
Figure 9B:
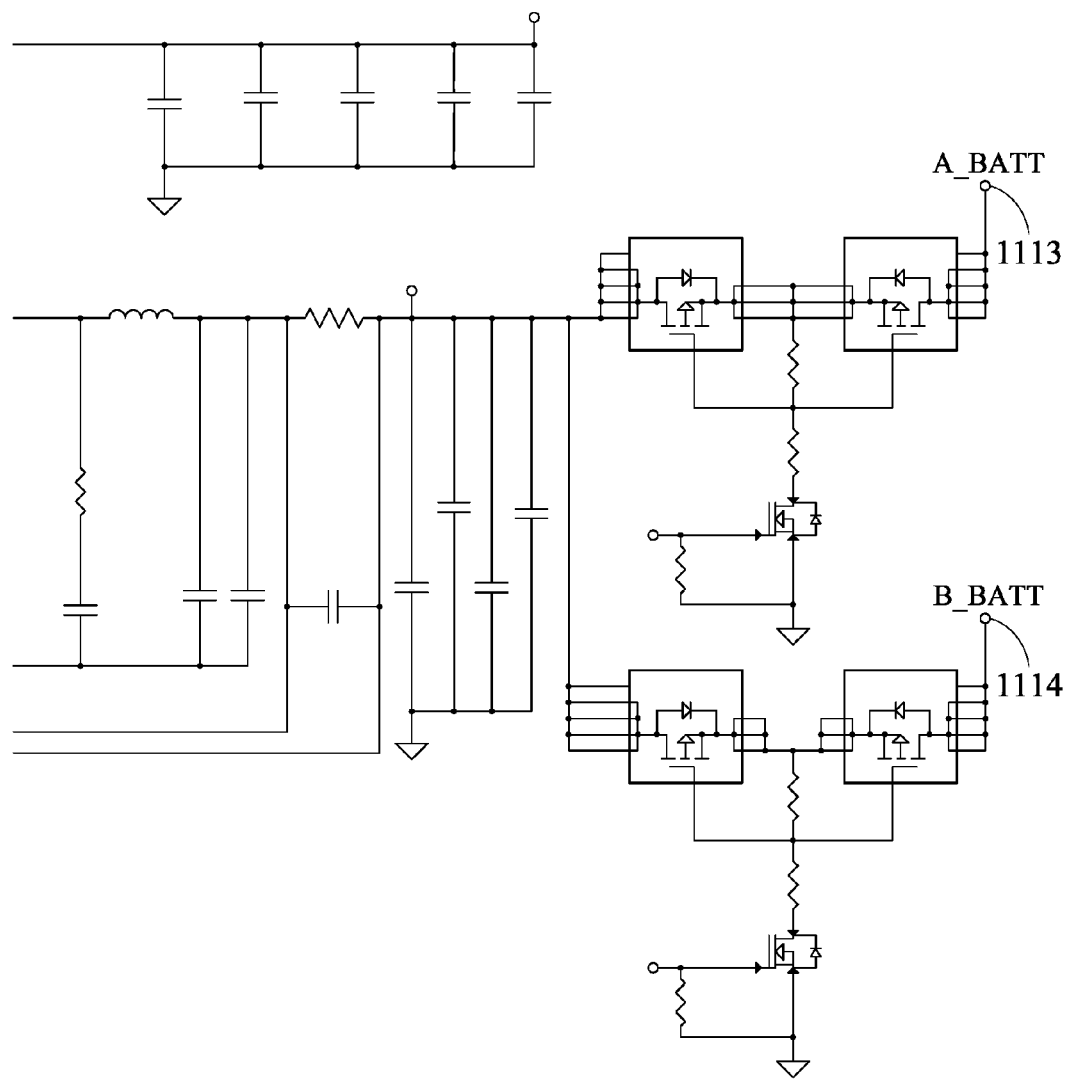

Referring to FIG. 8, in some embodiments, the system circuit 11 includes a battery circuit 111. The battery circuit 111 is connected to the power management circuit 14 and the control circuit 15. The power circuit 111 is for providing the power delivery device 10 with an energy storage function. The first power-down procedure in the plurality of power-down procedures is for reducing a charging current of the battery circuit 111 as an operation parameter. Thus, when the selected power-down group generated in step S207 is to exclude the first power-down procedure, the charging efficiency of the power delivery device 10 can still be maintained. Moreover, when the first power-down procedure is performed, the reduced charging current can reduce the power consumption of the battery circuit 111, thereby reducing the total power consumption of the system circuit 11. In some embodiments, the battery circuit 111 includes an energy storage element such as a primary battery or a secondary battery, and a charging/discharging circuit 1110 connected to the energy storage element (as shown in FIGS. 9A and 9B). In some embodiments, the magnitude of reduction in the charging current may be determined according to a difference between the total power consumption and the power consumption threshold.

In some embodiments, the power management circuit 14 further includes a voltage regulation circuit (not shown). The voltage regulation circuit is connected to the contact 1412 of the bidirectional switch 141 (as shown in FIG. 3). The voltage regulation circuit performs voltage regulation (for example, voltage stabilization, stepping-up and/or stepping-down processing) on the voltage of the system power SYV output by the contact 1412, so as to generate a charging voltage CHG_IN (as shown in FIGS. 9A and 9B).

As shown in FIGS. 9A and 9B, in some embodiments, a contact 1112 of the charging/discharging circuit 1110 is connected to the voltage regulation circuit, so as to acquire the charging voltage CHG_IN from the voltage regulation circuit.

The charging/discharging circuit 1110 may be implemented by a power supply integrated circuit IC4 and its matching circuits. A contact 1113 of the charging/discharging circuit 1110 is connected to a positive electrode terminal of the energy storage element of the battery circuit 111, and a contact 1114 of the charging/discharging circuit 1110 is connected to a negative electrode terminal of the energy storage element of the battery circuit 111. The charging/discharging circuit 1110 can generate a battery voltage A_BATT and a battery voltage B_BATT compliant with charging specifications of the energy storage element at the contact 1113 and the contact 1114 according to the charging voltage CHG_IN, respectively. The battery voltage A_BATT and the battery voltage B_BATT may respectively be a positive voltage and a negative voltage that are opposite. The charging/discharging circuit 1110 outputs the charging current to the energy storage element of the battery circuit 111 according to the battery voltage A_BATT and the battery voltage B_BATT, so as to charge the energy storage element.

As shown in FIGS. 4A to 4D, 9A and 9B, in some embodiments, a contact 1115 of the charging/discharging circuit 1110 is connected to a contact 1512 of the microcontroller 151, and a contact 1116 of the charging/discharging circuit 1110 is connected to a contact 1513 of the microcontroller 151. When the first power-down procedure is performed by the control circuit 15, the microcontroller 151 generates a current-down signal CHG_I2C_SDA at the contact 1512, and generates a clock signal CHG_I2C_SCL of a clock cycle associated with the current-down signal CHG_I2C_SDA at the contact 1513. The charging/discharging circuit 1110 reduces the charging current of the energy storage element of the battery circuit 111 according to the current-down signal CHG_I2C_SDA and the clock signal CHG_I2C_SCL. In some embodiments, the current-down signal CHG_I2C_SDA and the clock signal CHG_I2C_SCL may comply with signal specifications of an inter-integrated circuit (I²C) or system management bus (SMBus).

As shown in FIGS. 4A to 4D, 9A and 9B, in some embodiments, a contact 1514 of the charging/discharging circuit 151 is connected to the contact 1113 of the charging/discharging circuit 1110, and a contact 1515 of the charging/discharging circuit 151 is connected to a contact 1114 of the charging/discharging circuit 1110. Thus, the microcontroller 15 can be powered according to the battery voltage A_BATT and the battery voltage B_BATT. In some embodiments, a linear regulator 1516 is provided between a connection terminal DVCC1 of the microcontroller 151 and the contact 1514 of the microcontroller 151 and between a connection terminal DVCC2 of the microcontroller 151 and the contact 1515 of the microcontroller 151. The linear regulator 1516 can convert the battery voltage A_BATT and the battery voltage B_BATT into voltages suitable for the microcontroller 151. For example, assuming that the battery voltage A_BATT and the battery voltage B_BATT are each 3 V, the linear regulator 1516 can step up the battery voltage A_BATT and the battery voltage B_BATT to 3.3 V input voltages, and respectively input the 3.3 V input voltages to the connection terminal DVCC1 and the connection terminal DVCC2 of the microcontroller 151.

Figure 10:
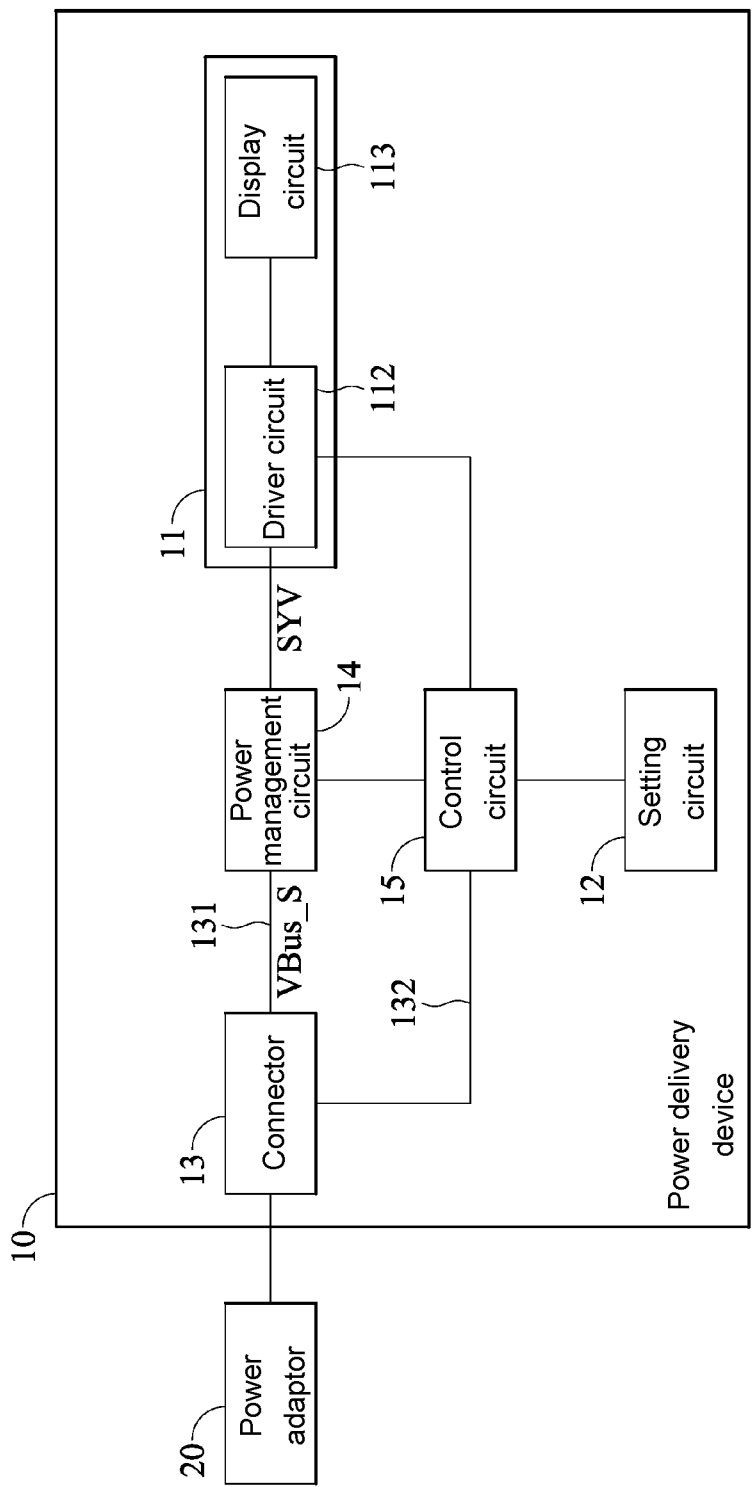
FIG. 10 is a schematic diagram of a power delivery device according to some embodiments.

Referring to FIG. 10, in some embodiments, the system circuit 11 includes a driver circuit 112 and a display circuit 113. The driver circuit 112 is connected to the power management circuit 14 and the control circuit 15. The display circuit 113 is connected to the driver circuit 112. The driver circuit 112 is for generating a pulse width modulation (PWM) signal to control the brightness of the display circuit 113. The display circuit 113 is for providing the power delivery device 10 with a data display function. The second power-down procedure in the plurality of power-down procedures is for changing the duty cycle of the PWM signal of the driver circuit 112 as an operation parameter to reduce the brightness. In some embodiments, the second power-down procedure may also be for reducing the maximum brightness value of the display circuit 113 as the operation parameter. Thus, when the selected power-down group generated in step S207 is to exclude the second power-down procedure, the display brightness of the power delivery device 10 can still be maintained. Moreover, when the second power-down procedure is performed, the power consumption of the display circuit 113 with the reduced brightness may be reduced, thereby reducing the total power consumption of the system circuit 11. The display circuit 113 may be, for example, a device having a display function, such as a projection display, a stereoscopic imaging display, and a light emitting diode display. In some embodiments, the magnitude of reduction in the brightness may be determined according to the difference between the total power consumption and the power supply threshold; that is to say, the magnitude of change in the duty cycle of the PWM signal or the magnitude of change in the maximum brightness may be determined according to the difference between the total power consumption and the power supply threshold.

Figure 12A:
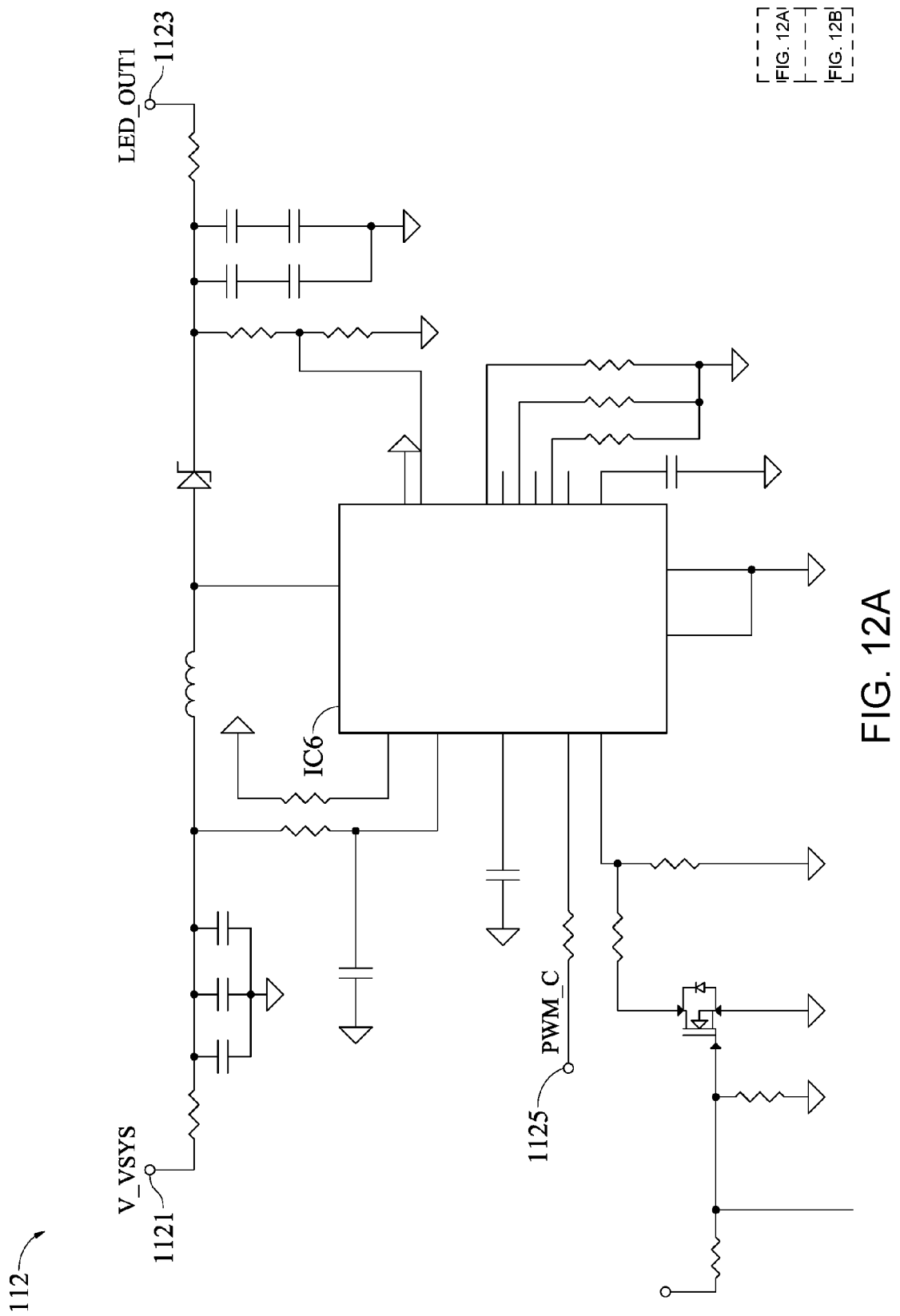
FIGS. 12A and 12B are schematic diagrams of a partial circuit of a driver circuit in an example.
Figure 12B:
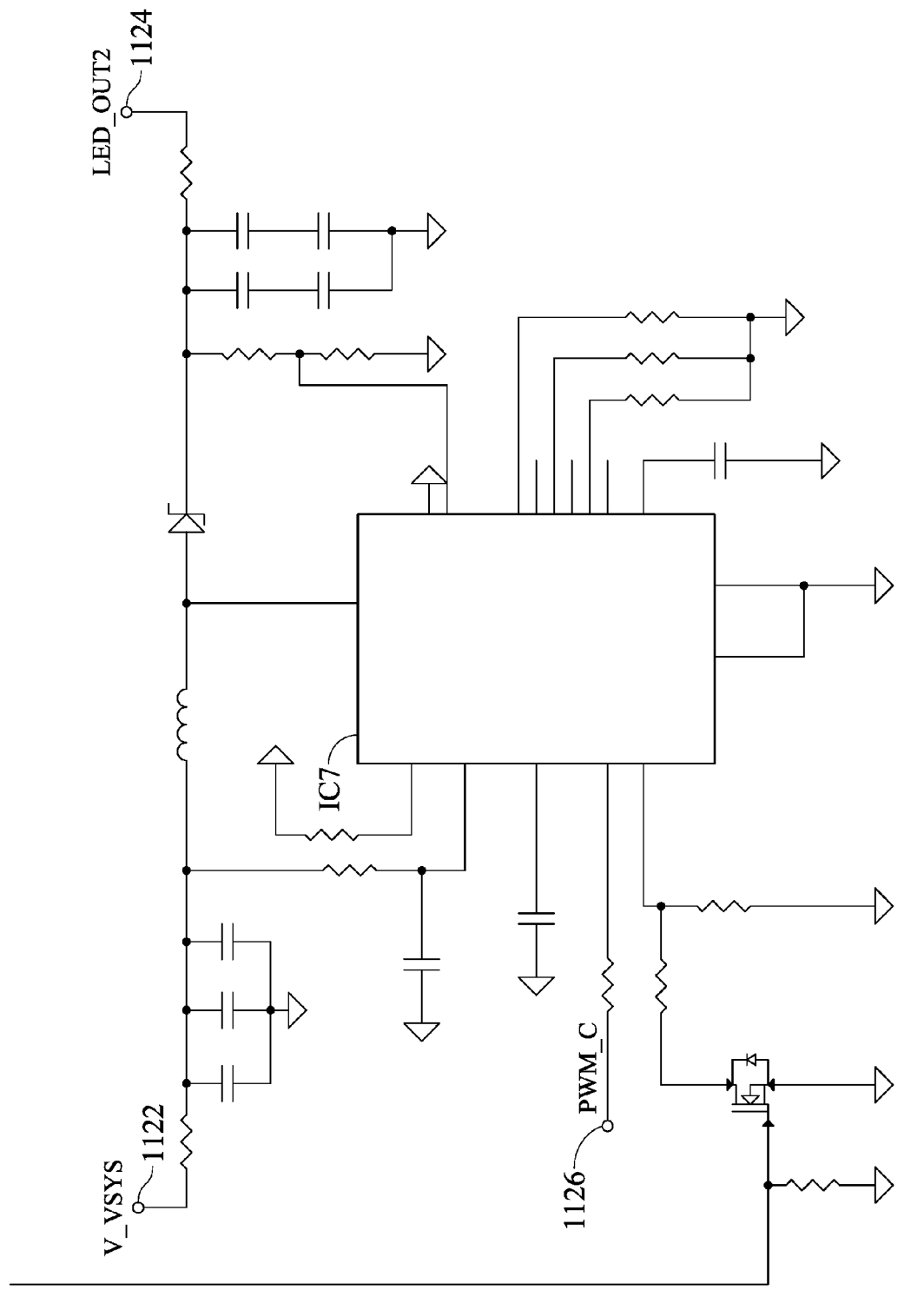
Figure 13:
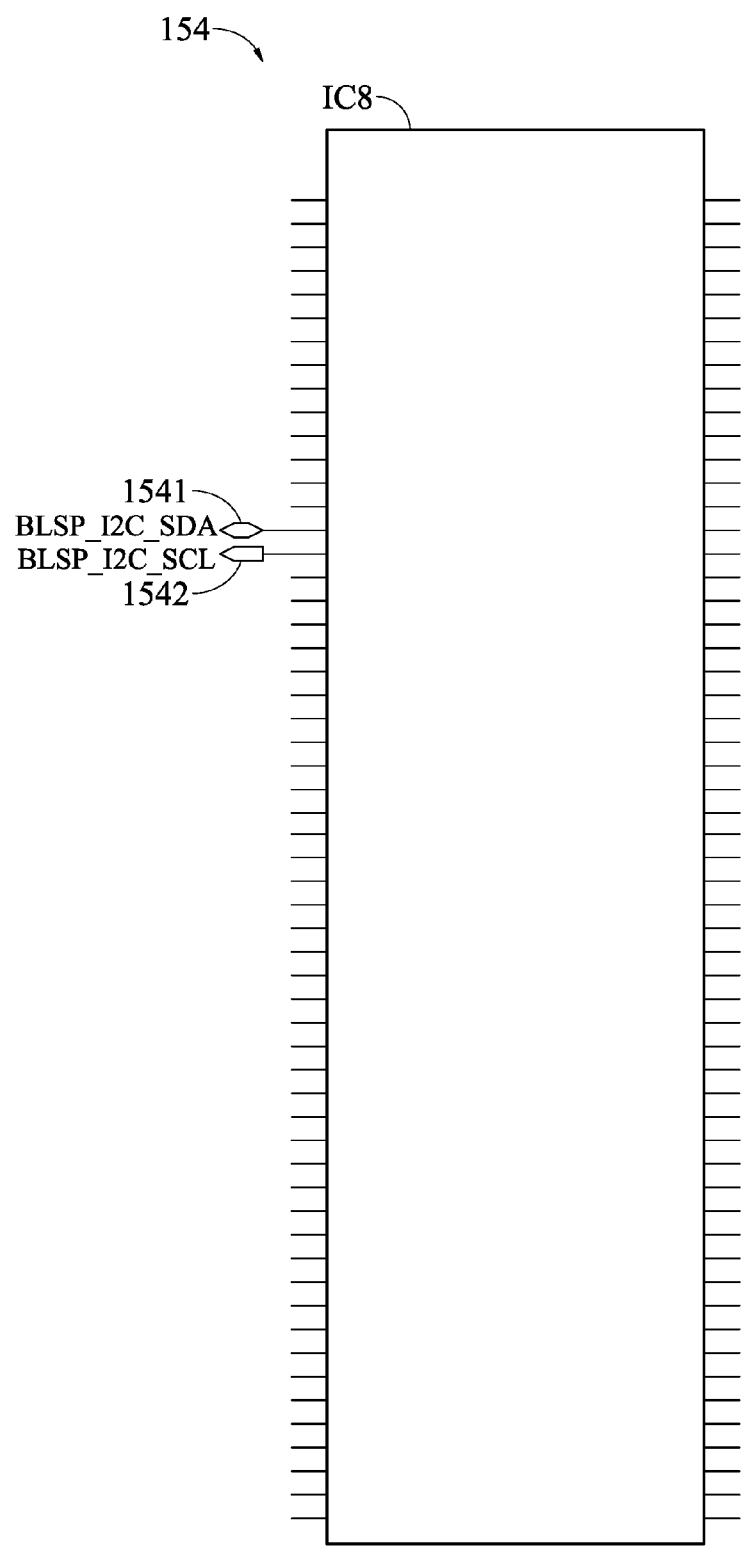
FIG. 13 is a schematic diagram of a partial circuit of a notification circuit of a control circuit in an example.

In some embodiments, in addition to generating the charging voltage CHG_IN (as shown in FIGS. 9A and 9B) through the system power SYV, the voltage regulation circuit of the power management circuit 14 can further generate an operating voltage V_VSYS (as shown in FIGS. 12A and 12B) of the driver circuit 112 through the system power SYV.

Figure 11:
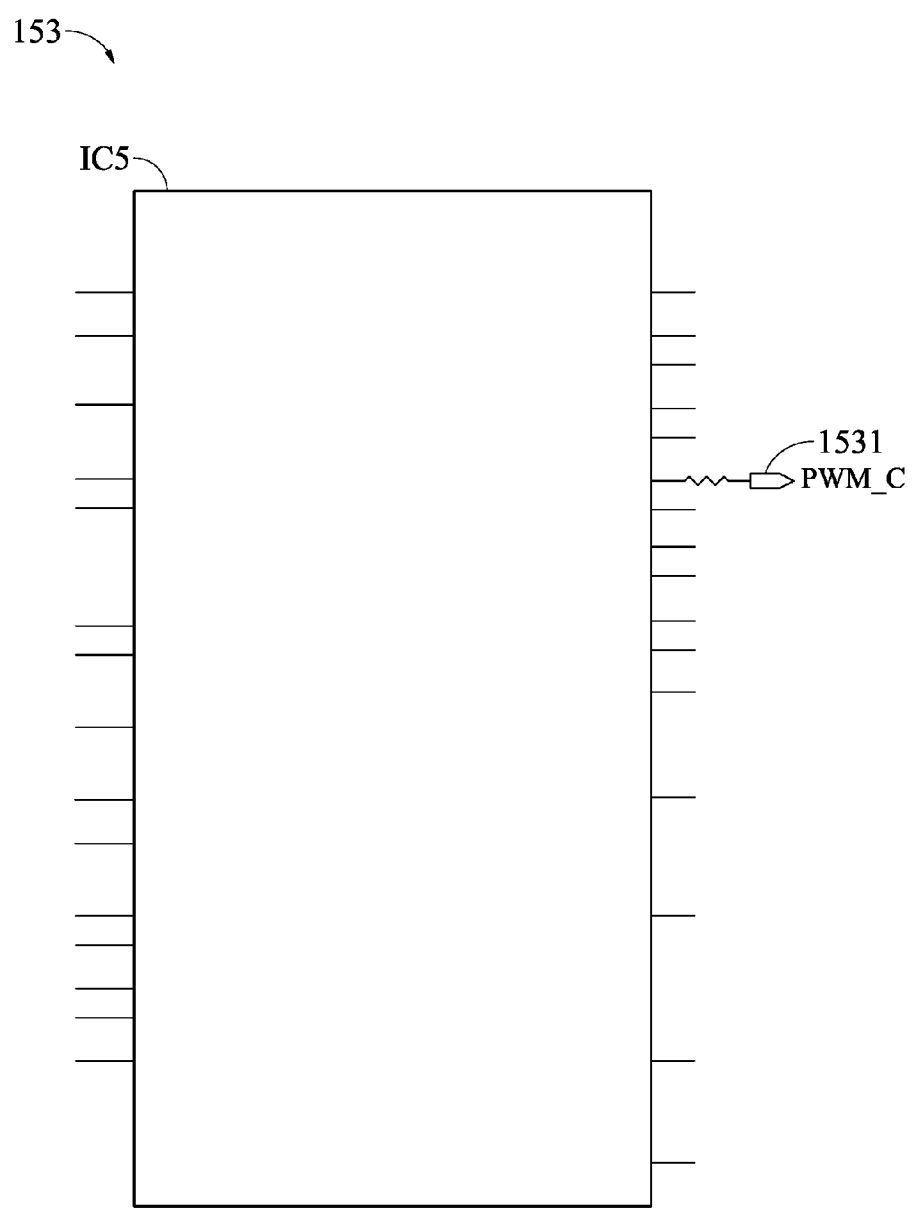
FIG. 11 is a schematic diagram of a partial circuit of a display controller of a control circuit in an example.

Referring to FIGS. 11, 12A and 12B, in some embodiments, the control circuit 15 includes a display controller 153. The display controller 153 may be implemented by a control integrated circuit 105 and its matching circuits, and the driver circuit 112 may be implemented by a first driver integrated circuit 106, a second driver integrated circuit 107 and their matching circuits. A contact 1121 and a contact 1122 of the driver circuit 112 are connected to the voltage regulation circuit of the power management circuit 14, so as to acquire the operating voltage V_VSYS, such that the driver circuit 112 may be in an operating mode. A contact 1123 and a contact 1124 of the driver circuit 112 are connected to the display circuit 113, so as to respectively output, in the operating mode, a first display voltage LED_OUT1 and a second display voltage LED_OUT2 at the contact 1123 and the contact 1124 to the display circuit 113. Thus, light emitting diodes of the display circuit 113 can be lit. A contact 1125 and a contact 1126 of the driver circuit 112 are connected to a contact 1531 of the display controller 153. When the second power-down procedure is performed by the control circuit 15, the display controller 153 sends a duty cycle change signal PWM_C to the driver circuit 112. The display controller 153 may generate a duty cycle change ratio according to the difference between the total power consumption and the power consumption threshold, and place the duty cycle change ratio in the duty cycle change signal PWM_C. The driver circuit 112 analyzes the duty cycle change signal PWM_C to acquire the duty cycle change ratio. The driver circuit 112 changes the duty cycle of its PWM signal according to the duty cycle change ratio, thereby changing a flickering frequency of the light emitting diodes of the display circuit 113. Thus, the brightness of the display circuit 113 may be reduced.

Referring to FIGS. 4A to 4D and FIG. 13, in some embodiments, the control circuit 15 includes a notification circuit 154. The notification circuit 154 may be implemented by a control integrated circuit IC8 and its matching circuits. A contact 1541 of the notification circuit 154 is connected to a contact 1519 of the microcontroller 151, and a contact 1542 of the notification circuit 154 is connected to a contact 1518 of the microcontroller 151. In some embodiments, the third power-down procedure in the plurality of power-down procedures is for reducing an operating frequency of the control circuit 15 as an operation parameter. For example, when the control circuit 15 is to perform the third power-down procedure, the notification circuit 154 generates an operating frequency adjustment signal BLSP_I2C_SDA at the contact 1541, and generates a clock signal BLSP_I2C_SCL of a clock cycle associated with the operating frequency adjustment signal BLSP_I2C_SDA at the contact 1542. The operating frequency adjustment signal BLSP_I2C_SDA and the clock signal BLSP_I2C_SCL of the clock cycle may be comply with signal specifications of the I$^2$C or SMBus. The contact 1519 of the microcontroller 151 receives the operating frequency adjustment signal BLSP_I2C_SDA, and the contact 1518 of the microcontroller 151 receives the clock signal BLSP_I2C_SCL. The operating frequency adjustment signal BLSP_I2C_SDA and the clock signal BLSP_I2C_SCL are signally translated by a bidirectional translator 1517, and are respectively input to a connection terminal USB1SDA and a connection terminal USB1SCL of the microcontroller 151. The microcontroller 151 reduces its operating frequency according to the signally translated operating frequency adjustment signal BLSP_I2C_SDA and clock signal BLSP_I2C_SCL to reduce its power consumption, thereby reducing the total power consumption of the system circuit 11. Moreover, when the selected power-down group generated in step S207 is to exclude the third power-down procedure, the data processing efficiency of the power delivery device 10 can still be maintained. In some embodiments, the magnitude of reduction in the operating frequency may be determined according to the difference between the total power consumption and the power consumption threshold.

Figure 14:
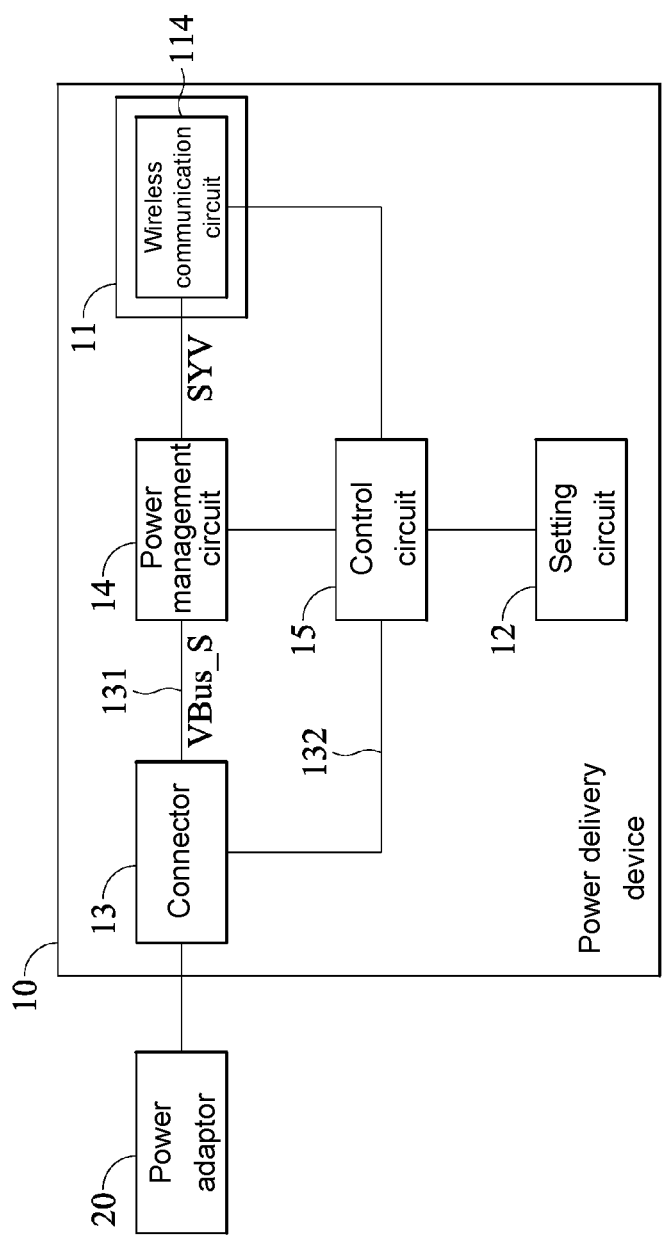
FIG. 14 is a schematic diagram of a power delivery device according to some embodiments.

Referring to FIG. 14, in some embodiments, the system circuit 11 includes a wireless communication circuit 114. The wireless communication circuit 114 is connected to the power management circuit 14 and the control circuit 15. The wireless communication circuit 114 is for providing a wireless communication function between the power delivery device 10 and an external device. The fourth power-down procedure in the plurality of power-down procedures is for reducing a radio-frequency (RF) power of the wireless communication circuit 114 as an operation parameter. Thus, when the selected power-down group generated in step S207 is to exclude the fourth power-down procedure, the transmission efficiency of the power delivery device 10 can still be maintained. Moreover, when the fourth power-down procedure is performed, the reduced RF power can reduce the power consumption of the wireless communication circuit 114, thereby reducing the total power consumption of the system circuit 11. In some embodiments, the wireless communication circuit 114 may be a WI-FI communication circuit. In some embodiments, the magnitude of reduction in the RF power may be determined according to the difference between the total power consumption and the power consumption threshold.

Figure 15:
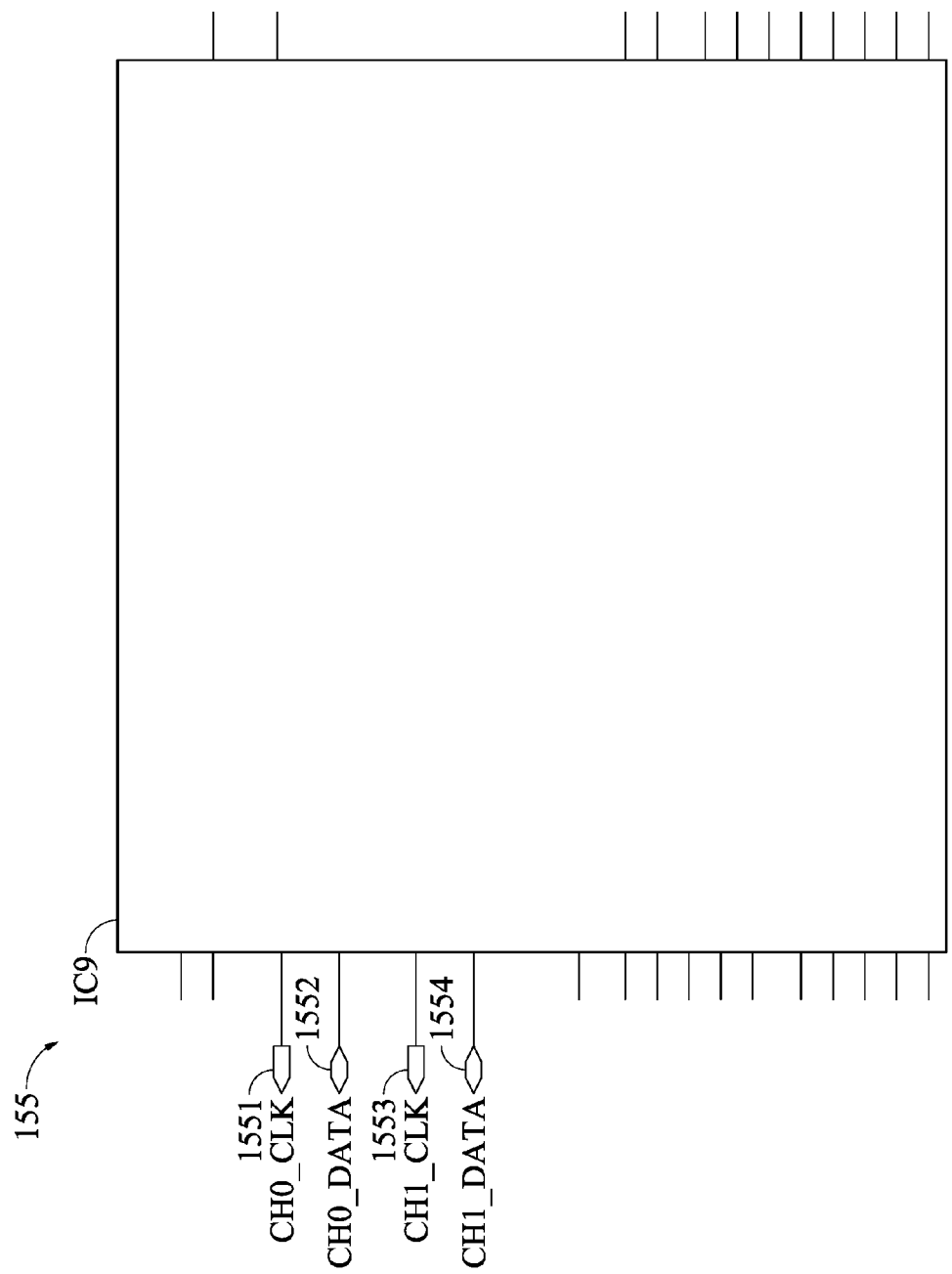
FIG. 15 is a schematic diagram of a partial circuit of a communication control sub-circuit of a control circuit in an example.
Figure 16:
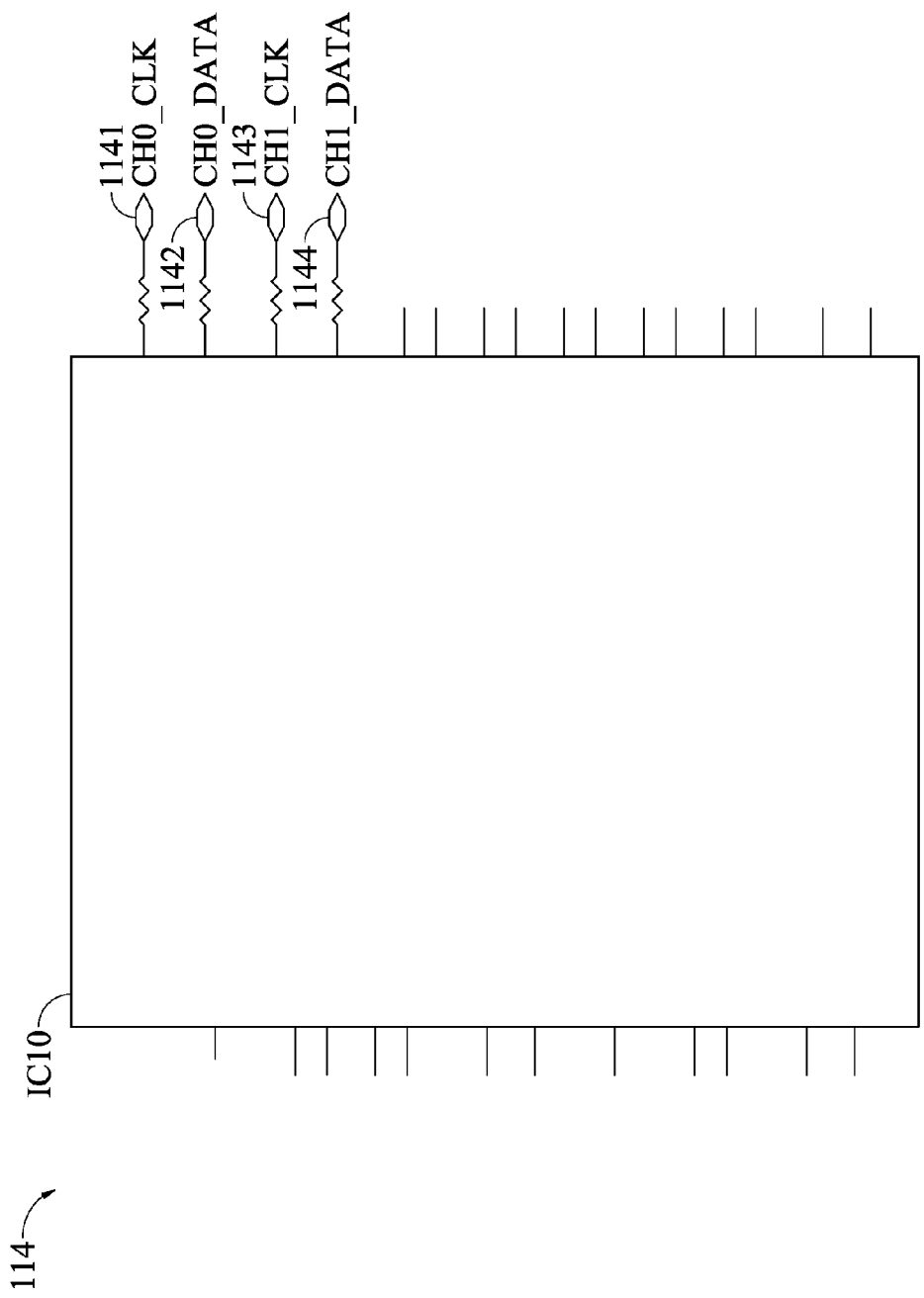
FIG. 16 is a schematic diagram of a partial circuit of a wireless communication circuit in an example.

Referring to FIG. 15 and FIG. 16, in some embodiments, the control circuit 15 includes a communication control sub-circuit 155. The communication control sub-circuit 155 may be implemented by a control integrated circuit IC9 and its matching circuits. The wireless communication circuit 114 may be implemented by a communication integrated circuit 1010 and its matching circuits. A contact 1551, a contact 1552, a contact 1553 and a contact 1554 of the communication control sub-circuit 155 are respectively connected to a contact 1141, a contact 1142, a contact 1143 and a contact 1144 of the wireless communication circuit 114. The communication control sub-circuit 155 is for controlling the operation of the wireless communication circuit 114. The signals transmitted by the contact 1551, the contact 1552, the contact 1141 and the contact 1142 correspond to a first communication channel of the wireless communication circuit 114. The signals transmitted by the contact 1553, the contact 1554, the contact 1143 and the contact 1144 correspond to a second communication channel of the wireless communication circuit 114. The transmission frequency of the second communication channel is different from the transmission frequency of the first communication channel; for example, the transmission frequency of the first communication channel is 2.4 GHz, and the transmission frequency of the second communication channel is 5 GHz. For example, when the control circuit 15 is to perform the fourth power-down procedure, the communication control sub-circuit 155 generates a first communication data signal CH0_DATA having a first power-down packet at the contact 1552, and generates a clock signal CH0_CLK of a clock cycle associated with the first communication data signal CH0_DATA at the contact 1551. The communication control sub-circuit 155 further generates a second communication data signal CH1_DATA having a second power-down packet at the contact 1554, and generates a clock signal CH1_CLK of a clock cycle associated with the second communication data signal CH01_DATA at the contact 1553. The wireless communication circuit 114 performs analysis according to the first communication data signal CH0_DATA and the clock signal CH0_CLK to obtain the first power-down packet so as to downgrade the communication quality of a first channel (for example, reducing the received signal strength indication (RSSI) of the first channel). The wireless communication circuit 114 performs analysis according to the second communication data signal CH1_DATA and the clock signal CH1_CLK to obtain the second power-down packet so as to downgrade the communication quality of a second channel (for example, reducing the RSSI of the second channel). Thus, the RF power can be reduced when the fourth power-down procedure is performed.

Figure 17:
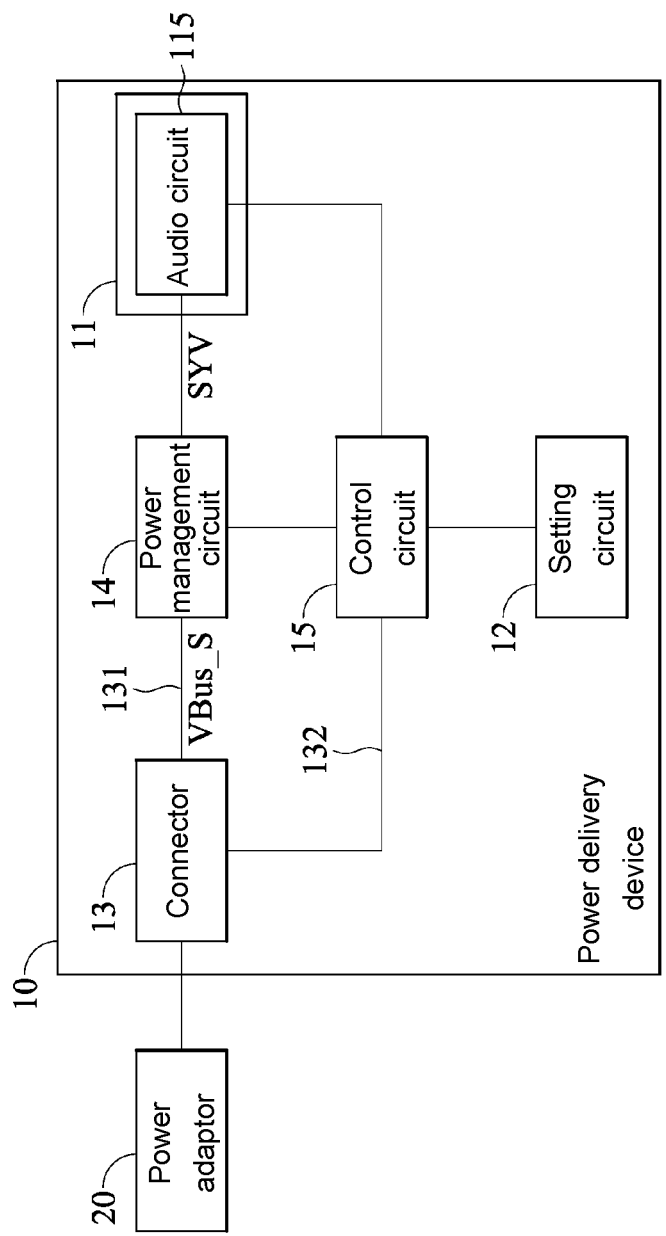
FIG. 17 is a schematic diagram of a power delivery device according to some embodiments.

Referring to FIG. 17, in some embodiments, the system circuit 11 includes an audio circuit 115. The audio circuit 115 is connected to the power management circuit 14 and the control circuit 15. The audio circuit 115 is for providing the power delivery device 10 with an audio playback and/or an audio recording function. A fifth power-down procedure in the plurality of power-down procedures is for reducing an audio power of the audio circuit 115 as an operation parameter. Moreover, when the fifth power-down procedure is performed, the reduced audio power can reduce the power consumption of the audio circuit 115, thereby reducing the total power consumption of the system circuit 11. In some embodiments, the audio circuit 115 may be a loudspeaker or a microphone. In some embodiments, the magnitude of reduction in the audio power may be determined according to the difference between the total power consumption and the power consumption threshold.

Figure 18:
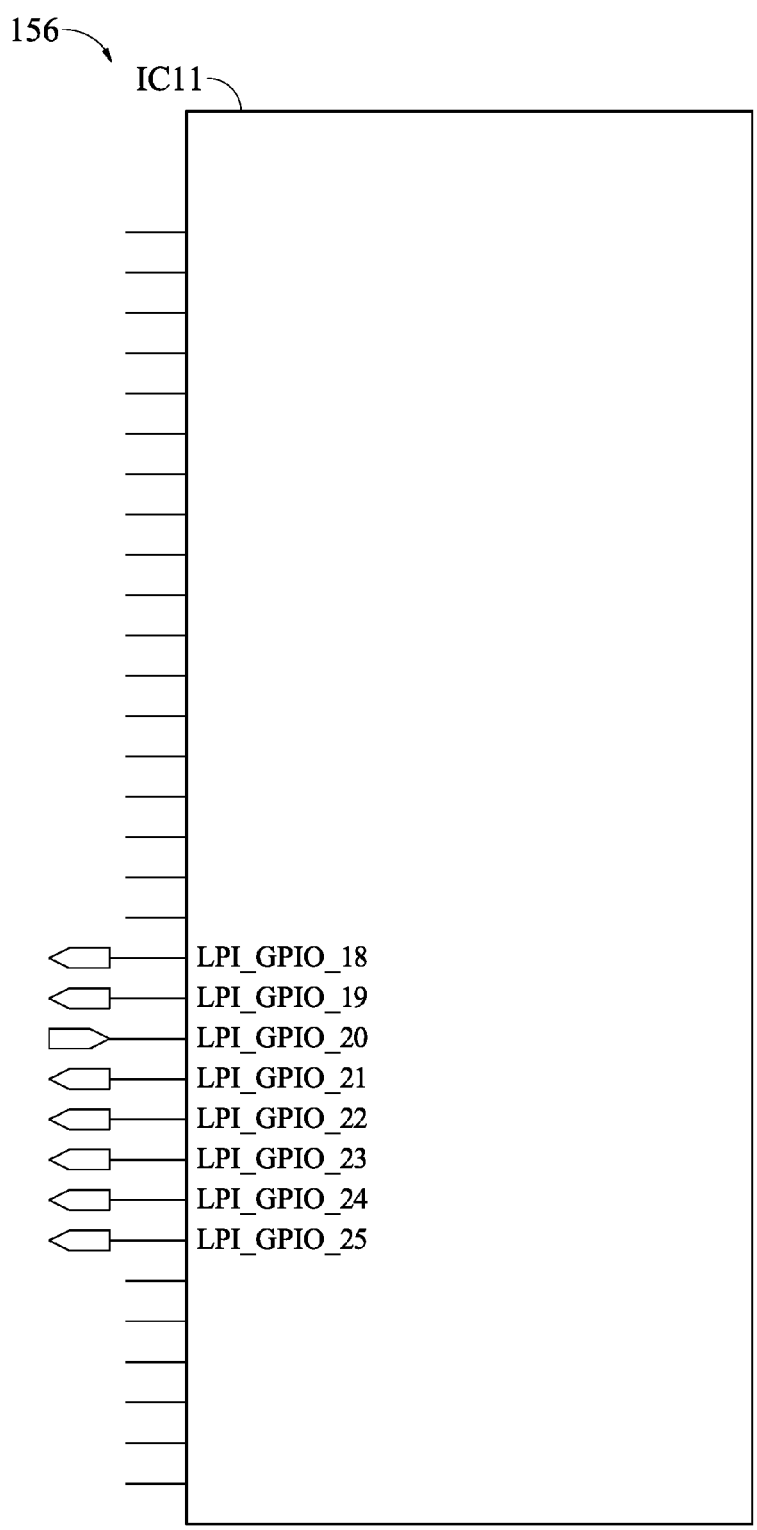
FIG. 18 is a schematic diagram of a partial circuit of an audio control sub-circuit of a control circuit in an example.
Figure 19:
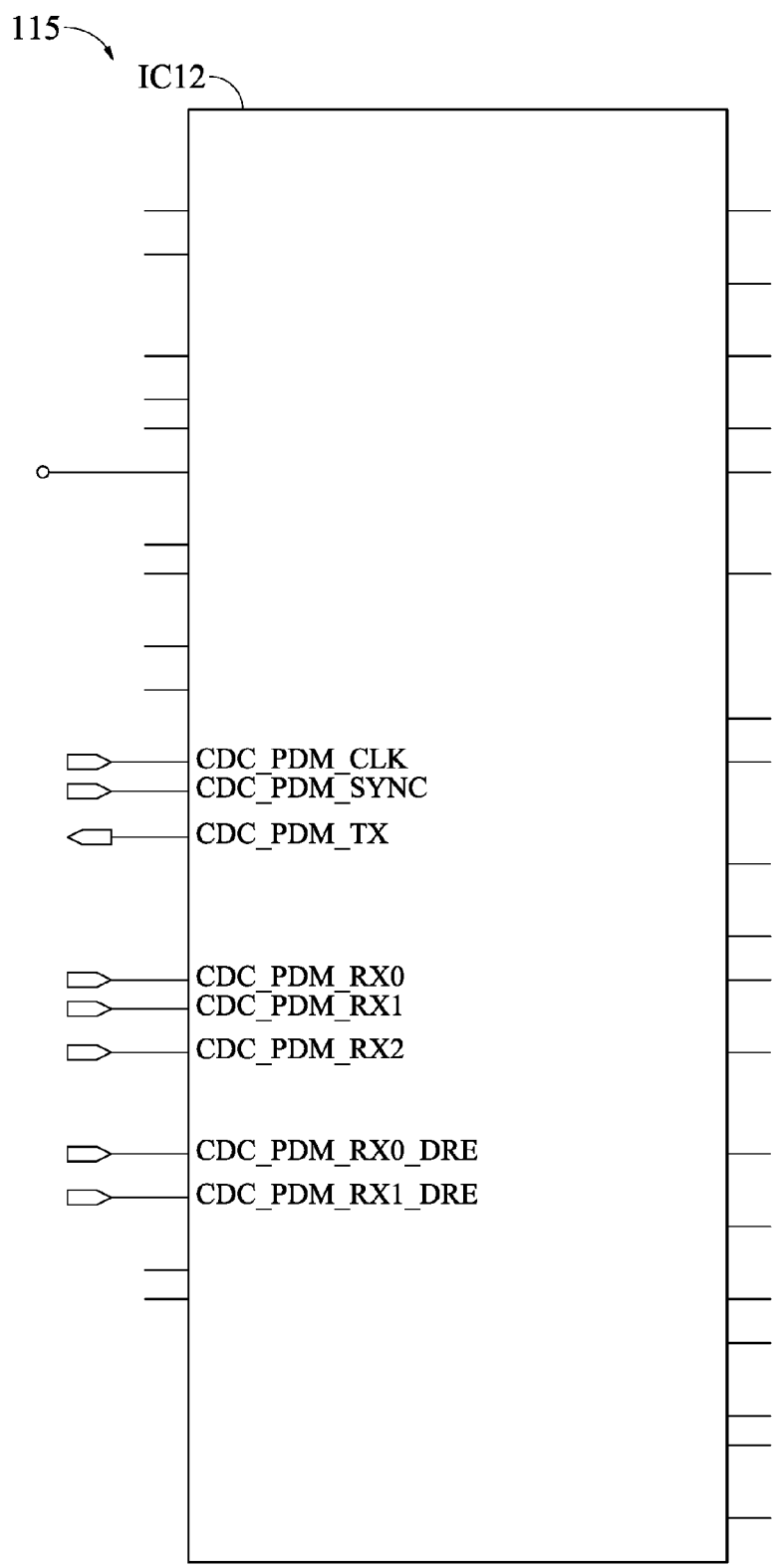
FIG. 19 is a schematic diagram of a partial circuit of an audio circuit in an example.

Referring to FIG. 18 and FIG. 19, in some embodiments, the control circuit 15 includes an audio control sub-circuit 156. The audio control sub-circuit 156 may be implemented by a control integrated circuit IC11 and its matching circuits. The audio circuit 115 may be implemented by an audio integrated circuit IC12 and its matching circuits. A connection terminal LPI_GPIO_18, a connection terminal LPI_GPIO_19, a connection terminal LPI_GPIO_20, a connection terminal LPI_GPIO_21, a connection terminal LPI_GPIO_22, a connection terminal LPI_GPIO_23, a connection terminal LPI_GPIO_24 and a connection terminal LPI_GPIO_25 (these connection terminal may form a first audio pulse density modulation (CDC-PEM) connection terminal) of the audio control sub-circuit 156 are connected to a connection terminal CDC_PDM_CLK, a connection terminal CDC_PDM_SYNC, a connection terminal CDC_PDM_TX, a connection terminal CDC_PDM_RX0, a connection terminal CDC_PDM_RX1, a connection terminal CDC_PDM_RX2, a connection terminal CDC_PDM_RX0_DRE and a connection terminal CDC_PDM_RX1_DRE (these connection terminals may form a second audio pulse density modulation (CDC-PEM) connection terminal matching the first CDC-PEM connection terminal) of the audio circuit 115. The audio control sub-circuit 156 is for controlling the operation of the audio circuit 115. For example, when the control circuit 115 is to perform the fifth power-down procedure, the audio control sub-circuit 156 generates a PDM signal at the first CDC-PEM connection terminal, and transmits the PDM signal to the audio circuit 115 through the second CDC-PEM connection terminal. The audio circuit 115 reduces, according to the PDM signal, the amplitude of the audio being played to thereby reduce the power of the audio. In some embodiments, the magnitude of reduction in the amplitude of the audio may be determined according to the difference between the total power consumption and the power consumption threshold.

In some embodiments, a sixth power-down procedure in the plurality of power-down procedures is for reducing a polling frequency of the control circuit 15 as an operation parameter. The polling frequency is a frequency at which each of the peripheral devices (for example, the driver circuit 112, the power management circuit 14, the wireless communication circuit 114 and the audio circuit 115) is repeated asked whether services are needed. Thus, when the sixth power-down procedure is performed, the reduced polling frequency can reduce the power consumption of the control circuit 15, thereby reducing the total power consumption of the system circuit 11. In some embodiments, the magnitude of reduction in the polling frequency may be determined according to the difference between the total power consumption and the power consumption threshold.

In conclusion, according to any of the embodiments, the power delivery device, by implementing the control method thereof, is capable of determining whether the power supply quota of the power adaptor satisfies the total power consumption of the system circuit, and reducing the total power consumption when the power supply quota does not satisfy the total power consumption. Thus, the power delivery device is capable of continually drawing electric power from the power adaptor and operating normally when it is externally connected to a power adaptor that does not meet its required specifications. In some embodiments, the power delivery device, by implementing the control method thereof, is capable of excluding a power-down procedure inappropriate for a current scenario, such that the power delivery device is allowed to draw electric power rapidly from the power adaptor that does not meet its required specifications.

What is claimed is:

1. A power delivery device, comprising:
   a system circuit;
   a setting circuit generating a different scenario setting signal in response to a different input;
   a connector adapted to be externally connected to a power adaptor, the connector comprising a power supply pin and a configuration channel pin;
   a power management circuit connected to the connector and the system circuit for drawing a supply power through the power supply pin when the connector is externally connected to the power adaptor, providing a system power to the system circuit, and detecting a total power consumption of the system circuit; and
   a control circuit connected to the system circuit, the setting circuit, the connector and the power management circuit and having a plurality of scenario modes, a plurality of exclusion parameters and a plurality of power-down procedures stored therein, wherein the plurality of scenario modes correspond to the different scenario setting signal and the plurality of exclusion parameters, and the plurality of exclusion parameters correspond to the plurality of power-down procedures, and each of the plurality of power-down procedures is for changing a different operation parameter of one between the system circuit and the control circuit;
   wherein, the control circuit communicates with the power adaptor through the configuration channel pin, so as to acquire a power supply quota of the power adaptor; and
   wherein, the control circuit is for further selecting a corresponding scenario mode from the plurality of scenario modes according to a scenario setting signal generated by the setting circuit when the total power consumption of the system circuit is greater than a power consumption threshold, selecting a corresponding exclusion parameter from the plurality of exclusion parameters according to the corresponding scenario mode, excluding a corresponding power-down procedure from the plurality of power-down procedures according to the corresponding exclusion parameter to generate a selected power-down group, and performing at least one power-down procedure in the selected power-down group to reduce the total power consumption, wherein the power consumption threshold is generated according to the power supply quota acquired.

2. The power delivery device according to claim 1, wherein the system circuit comprises a battery circuit, and a first power-down procedure in the plurality of power-down procedures is for reducing a charging current of the battery circuit as the operation parameter.

3. The power delivery device according to claim 1, wherein the system circuit comprises a display circuit and a driver circuit, the driver circuit is for generating a pulse width modulation (PWM) signal to control a brightness of the display circuit, and a second power-down procedure in the plurality of power-down procedures is for changing a duty cycle of the PWM signal of the driver circuit as the operation parameter or changing a maximum brightness of the display circuit as the operation parameter, so as to reduce the brightness.

4. The power delivery device according to claim 1, wherein a third power-down procedure in the plurality of power-down procedures is for reducing an operating frequency of the control circuit as the operation parameter.

5. The power delivery device according to claim 1, wherein the system circuit comprises a wireless communication circuit, and a fourth power-down procedure in the plurality of power-down procedures is for reducing a radio-frequency (RF) power of the wireless communication circuit as the operation parameter.

6. The power delivery device according to claim 1, wherein the system circuit comprises an audio circuit, and a fifth power-down procedure in the plurality of power-down procedures is for reducing an audio power of the audio circuit as the operation parameter.

7. The power delivery device according to claim 1, wherein a sixth power-down procedure in the plurality of power-down procedures is for reducing a polling frequency of the control circuit as the operation parameter.

8. The power delivery device according to claim 1, wherein the setting circuit is a user interface.

9. The power delivery device according to claim 8, wherein the user interface is a keyboard having a plurality of keys or a touch display panel having a plurality of option icons.

10. A control method of a power delivery device, comprising:
communicating with a power adaptor through a configuration channel pin of a connector to acquire a power supply quota of the power adaptor, and generating a power consumption threshold based on the acquired power supply quota;
when the connector is externally connected to the power adaptor, drawing a supply power through a power supply pin of the connector, and providing a system power to a system circuit according to the supply power;
detecting a total power consumption of the system circuit;
selecting, based upon the total power consumption being greater than the power consumption threshold, a corresponding scenario mode from a plurality of scenario modes according to a scenario setting signal generated by a setting circuit, wherein the plurality of scenario modes respectively correspond to a plurality of exclusion parameters and respectively correspond to a plurality of different scenario setting signals, and the scenario setting signal generated by the setting circuit is one of the plurality of different scenario setting signals;
selecting a corresponding exclusion parameter from the plurality of exclusion parameters according to the corresponding scenario mode;
selecting a corresponding power-down procedure from a plurality of power-down procedures according to the corresponding exclusion parameter to generate a selected power-down group, wherein the plurality of exclusion parameters respectively correspond to the plurality of power-down procedures, and each of the plurality of power-down procedures is for changing a different operation parameter of one between the system circuit and a control circuit; and
performing at least one power-down procedure in the selected power-down group to reduce the total power consumption.

\* \* \* \* \*